US012757240B2

(12) United States Patent
Matsumoto et al.

(10) Patent No.: US 12,757,240 B2
(45) Date of Patent: Oct. 6, 2026

(54) WIRELESS COMMUNICATION SYSTEM AND WIRELESS COMMUNICATION METHOD

(71) Applicant: DENSO CORPORATION, Kariya-city (JP)

(72) Inventors: Sho Matsumoto, Kariya-city (JP); Youichi Hayase, Kariya-city (JP); Yuto Honda, Kariya-city (JP); Tadashi Nakashima, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 325 days.

(21) Appl. No.: 18/589,954

(22) Filed: Feb. 28, 2024

(65) Prior Publication Data

US 2024/0298343 A1 Sep. 5, 2024

(30) Foreign Application Priority Data

Mar. 2, 2023 (JP) ................................. 2023-032172

(51) Int. Cl.
*H04W 72/542* (2023.01)

(52) U.S. Cl.
CPC ................................. *H04W 72/542* (2023.01)

(58) Field of Classification Search
None
See application file for complete search history.

(56) References Cited

U.S. PATENT DOCUMENTS

| | | | |
|---|---|---|---|
| 2006/0089149 A1 | 4/2006 | Kizu et al. | |
| 2006/0188004 A1 | 8/2006 | Kizu et al. | |
| 2009/0041088 A1* | 2/2009 | Yang | H04L 1/0072 375/E1.035 |
| 2009/0274193 A1 | 11/2009 | Kizu et al. | |
| 2013/0163641 A1 | 6/2013 | Kizu et al. | |
| 2013/0163642 A1 | 6/2013 | Kizu et al. | |
| 2014/0328376 A1 | 11/2014 | Kizu et al. | |
| 2016/0021675 A1 | 1/2016 | Kizu et al. | |
| 2017/0280458 A1* | 9/2017 | Lou | G06F 3/165 |
| 2021/0385674 A1* | 12/2021 | Korneliussen | H04W 24/08 |

FOREIGN PATENT DOCUMENTS

WO 2015/189898 A1 12/2015

* cited by examiner

*Primary Examiner* — Benjamin Lamont
(74) *Attorney, Agent, or Firm* — Posz Law Group, PLC

(57) ABSTRACT

A wireless communication system is configured to detect characteristic data indicating communication quality in the performed wireless communication, for each of the communication channels, delete communication channel, in which deterioration in communication quality is determined based on the characteristic data detected by the detection unit, from the plurality of communication channels used for the wireless communication, and determine, based on the characteristic data of a neighboring communication channel close in frequency to a communication channel that has been deleted by the deletion unit, restorability of the deleted communication channel to the plurality of communication channels used for the wireless communication.

11 Claims, 19 Drawing Sheets

WIRELESS COMMUNICATION SYSTEM AND WIRELESS COMMUNICATION METHOD

CROSS REFERENCE TO RELATED APPLICATION

This application is based on Japanese Patent Application No. 2023-032172 filed on Mar. 2, 2023, the disclosure of which is incorporated herein by reference.

TECHNICAL FIELD

The present disclosure relates to a wireless communication system and a wireless communication method for performing wireless communication between a master device and a slave device via one communication channel that is sequentially selected from multiple communication channels.

BACKGROUND

This type of wireless communication system is known, for example, as described in a related art. In the wireless communication system disclosed in the related art, when an error occurs on a packet and an RSSI value of a radio signal of the packet is larger than a preset threshold Th1, a reception operation, in which the packet is received, is determined to be a reception error due to interference with other radio waves. The number of receptions and the number of reception errors are counted, and frequencies of the reception errors (the number of reception errors/the number of receptions) due to interference in each frequency channel are stored. When a reception error frequency exceeds a threshold Th2, a determination is made that an interference source exists in the frequency channel of which the reception error frequency due to interference exceeds the threshold Th2, and the frequency channel is stored as an unusable channel.

SUMMARY

A wireless communication system is configured to detect characteristic data indicating communication quality in the performed wireless communication, for each of the communication channels, delete communication channel, in which deterioration in communication quality is determined based on the characteristic data detected by the detection unit, from the plurality of communication channels used for the wireless communication, and determine, based on the characteristic data of a neighboring communication channel close in frequency to a communication channel that has been deleted by the deletion unit, restorability of the deleted communication channel to the plurality of communication channels used for the wireless communication.

BRIEF DESCRIPTION OF DRAWINGS

Objects, features and advantages of the present disclosure will become more apparent from the following detailed description made with reference to the accompanying drawings. In the drawings.

DETAILED DESCRIPTION

Figure 1:
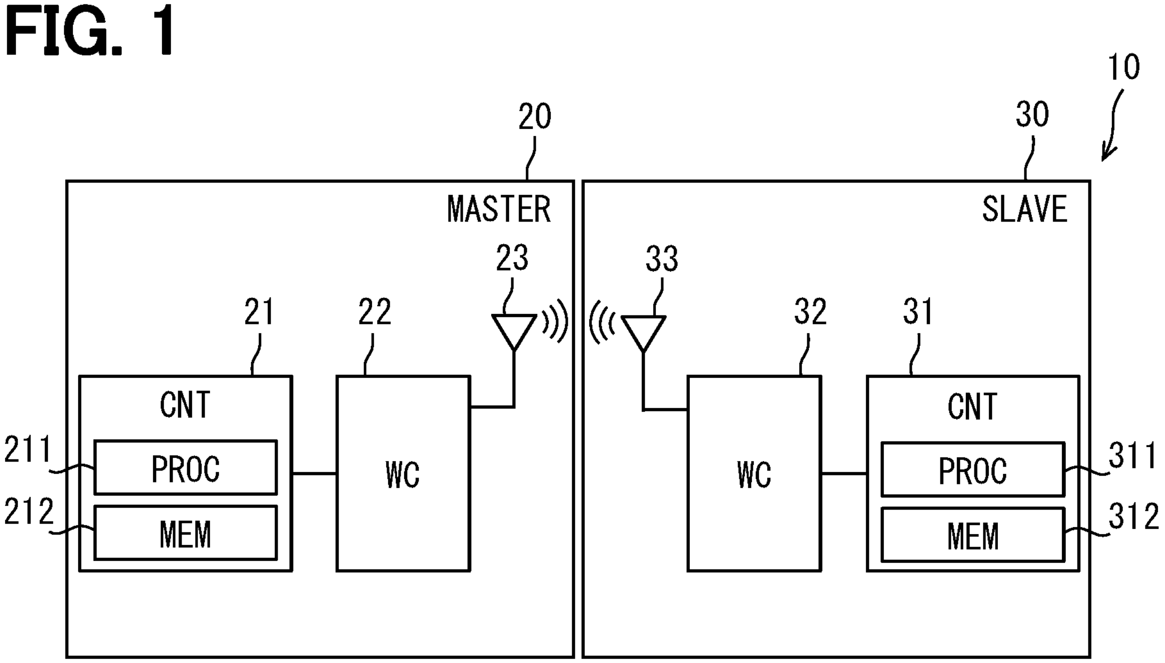
FIG. 1 is a block diagram showing a schematic configuration of a wireless communication system according to a first embodiment.

In the wireless communication system disclosed in a related art, a frequency channel, which is set as an unusable channel, is returned to a usable frequency channel after a set period has elapsed.

However, the communication environment of each communication channel used in the wireless communication system, including interference with other radio waves, does not necessarily change even after the set period has elapsed. Therefore, in a case where an unusable communication channel is changed to a usable communication channel when the set period has elapsed, there is a high possibility that wireless communication is performed using a communication channel having deteriorated communication quality. As a result, there is a concern that a communication success rate of the wireless communication system may decrease.

The present disclosure provides a wireless communication system and a wireless communication method capable of accurately determining whether communication quality of a communication channel, which is set unusable due to the poor communication quality, is improved.

According to one aspect of the present disclosure, a wireless communication system that performs wireless communication between a master device and a slave device via one communication channel, which is sequentially selected from a plurality of communication channels is provided. The wireless communication system comprises: a detection unit that detects characteristic data indicating communication quality in the performed wireless communication, for each of the communication channels; a deletion unit that deletes communication channel, in which deterioration in communication quality is determined based on the characteristic data detected by the detection unit, from the plurality of communication channels used for the wireless communication; and a determination unit that determines, based on the characteristic data of a neighboring communication channel close in frequency to a communication channel that has been deleted by the deletion unit, restorability of the deleted communication channel to the plurality of communication channels used for the wireless communication.

According to one aspect of the present disclosure, a wireless communication method of performing wireless communication between a master device and a slave device via one communication channel, which is sequentially selected from a plurality of communication channels is provided. The wireless communication method comprises: a detection step of detecting characteristic data indicating communication quality in the performed wireless communication, for each of the communication channels; a deletion step of deleting the communication channel, in which deterioration in communication quality is determined based on the characteristic data detected in the detection step, from the plurality of communication channels used for the wireless communication; and a determination step of determining, based on the characteristic data of a neighboring communication channel close in frequency to a communication channel that has been deleted in the deletion step, restorability of the deleted communication channel to the plurality of communication channels used for the wireless communication.

As described above, in a wireless communication system and a wireless communication method according to the present disclosure, restorability of a deleted communication channel, which has been deleted from multiple communication channels used for wireless communication, is determined based on characteristic data of a neighboring communication channel that is close in frequency to the deleted communication channel. Usually, the communication quality of the neighboring communication channel has a correlation with the communication quality of the deleted communication channel because the frequencies are close. Therefore, based on the characteristic data of the neighboring communication channel that is close in frequency, restorability of the deleted communication channel can be determined with high accuracy.

The following will describe embodiments of the present disclosure with reference to the drawings. Note that the same or similar components are denoted by the same reference numerals throughout a plurality of drawings, and description thereof may be omitted. When only a part of a configuration is described in each embodiment, the configurations of other embodiments previously described can be applied to the other parts of the configuration. In addition to the combination of the configurations explicitly described in the description of each embodiment, the configurations of multiple embodiments may be partially combined even if not explicitly described as long as there is no difficulty in the combination.

First Embodiment

A wireless communication system and a wireless communication method according to a first embodiment will be described below. The wireless communication system of the present embodiment includes a master device and a slave device. At least one of the master device and the slave device may be used while being mounted on a moving object. The moving object includes, for example, a vehicle such as an automobile or a railroad vehicle, a flying object such as an electric vertical takeoff and landing aircraft or a drone, a ship, a construction machine, an agricultural machine, and the like.

As a specific application in a vehicle, the wireless communication system according to the present embodiment can be applied, for example, to a battery management system that manages batteries installed as a battery pack in an electric drive vehicle such as an electric vehicle, a hybrid vehicle, and a plug-in hybrid vehicle. When applied to a battery management system, for example, a master device is connected to a battery control device, and multiple slave devices are respectively connected to a monitoring device provided for each of multiple cell stacks forming a battery pack. In this case, both the master device and the slave device are mounted on the vehicle.

Each monitoring device provided for each of the multiple cell stacks acquires battery information such as the voltage and current of each battery cell included in the corresponding cell stack and the temperature of the cell stack using various sensors and the like. When each monitoring device receives data requesting the battery information from the battery control device via the wireless communication system, each monitoring device transmits the acquired battery information to the battery control device via the wireless communication system. The battery control device calculates the state of charge (SOC) of the entire cell stack based on the acquired battery information, drives the temperature raising and cooling mechanism in order to adjust the temperature of the battery pack to an appropriate range, and determines whether to execute a so-called equalization process of equalizing the voltages of each battery cell. The battery control device instructs the corresponding monitoring device to execute the equalization process via the wireless communication system when a determination is made that it is necessary to execute the equalization process on at least one cell stack. Each monitoring device performs a process of determining abnormalities in various sensors or abnormalities in the monitoring device's own operations and transmits abnormality information to the battery control device via the wireless communication system when an abnormality is determined.

Alternatively, the wireless communication system according to the present embodiment may be applied to a so-called smart key system or a tire pressure monitoring system in a vehicle. When applied to a smart key system, for example, the master device is mounted on the vehicle and connected to a control device that controls the locking and unlocking of vehicle doors and turning on and off a driving source such as a vehicle engine. The multiple slave devices are installed in mobile keys or mobile terminals owned by multiple users. When applied to a tire pressure monitoring system, the master device is mounted on the vehicle and connected to a control device that displays tire pressure or issues warnings or the like when air pressure is abnormal. The multiple slave devices are provided within each tire and are connected to an air pressure detection device also provided within each tire. The wireless communication system according to the present embodiment may be applied to a vehicle diagnostic system. In this case, for example, the multiple slave devices are connected to multiple in-vehicle equipment equipped with a self-diagnosis function, and the master device is connected to a diagnostic control device installed at a service factory. In these examples, at least one of the master device and the multiple slave devices is disposed at a fixed position, and/or at least one is mounted on the vehicle.

The application example of the wireless communication system according to the present embodiment is not limited to a vehicle, and as described above, the wireless communication system can also be applied to a moving object other than vehicles, for example, to a system for controlling or managing various types of equipment, such as a flying object such as a drone, a ship, a construction machine, and an agricultural machine. The wireless communication system according to the present embodiment can also be applied to a system for controlling or managing various types of equipment in a structure such as a building, a production facility such as a factory, or the like.

FIG. 1 is a block diagram showing a schematic configuration of the wireless communication system 10. Both the master device 20 and the slave device 30 of the wireless communication system 10 are mounted on, for example, a vehicle (automobile). At this time, the master device 20 and the slave device 30 may be disposed in a common housing or may not be disposed in a common housing. The number of master devices 20 may be one or more. Similarly, the number of slave devices 30 may be one or more. The master device 20 and the slave device 30 perform wireless communication via one communication channel that is sequentially selected from multiple communication channels, such as Bluetooth low energy communication (Bluetooth is a registered trademark, hereinafter referred to as Bluetooth LE), for example.

As an example, the wireless communication system 10 of the present embodiment includes one master device 20 and multiple slave devices 30. Although only one slave device 30 is shown in FIG. 1 for simplification of illustration, all of the multiple slave devices 30 may be configured in the same way.

In the wireless communication between the master device 20 and the slave device 30, a frequency band used for short-range communication, such as a 2.4 GHz band or a 5 GHz band, can be used. Radio waves in such a high frequency band tend to travel more straightly than radio waves in the LF band and are more likely to be reflected by a metal object such as a body of a vehicle. LF is an abbreviation for Low Frequency. As the short-range communication standards, for example, Bluetooth, Bluetooth LE, or the like can be adopted. As an example, the master device 20 and the slave device 30 of the present embodiment are configured to be capable of performing wireless communication based on the Bluetooth LE standard. Details of the communication method related to communication connection, encrypted communication, and the like are performed according to a sequence defined by the Bluetooth LE standard.

As shown in FIG. 1, the master device 20 includes a control circuit (CNT) 21, a wireless communication circuit (WC) 22, and an antenna 23. In addition to the above-described elements, the master device 20 includes an input-output interface or a bus line for wired or wireless communication with devices other than the slave device 30.

The control circuit 21 includes, for example, a processor 211 and a memory 212. The memory 212 includes, for example, RAM and ROM. RAM is an abbreviation for Random Access Memory. ROM is an abbreviation for Read Only Memory.

In the control circuit 21, the processor 211 executes a predetermined process (control) by executing a program stored in the ROM while using the RAM as a temporary storage area. The processor 211 constructs multiple function units by executing multiple instructions included in the program. A storage medium of the program is not limited to ROM. For example, various storage media such as HDD or SSD can be adopted. HDD is an abbreviation for Hard-disk Drive. SSD is an abbreviation for Solid State Drive.

The processor 211 is, for example, a CPU, an MPU, a GPU, a DFP, or the like. CPU is an abbreviation for Central Processing Unit. MPU is an abbreviation for Micro-Processing Unit. GPU is an abbreviation for Graphics Processing Unit. DFP is an abbreviation for Data Flow Processor. The control circuit 21 may be realized by combining multiple types of calculation processing devices such as a CPU, an MPU, and a GPU.

The control circuit 21 may be realized as an SoC. SoC is an abbreviation for System on Chip. The control circuit 21 may be realized using ASIC or FPGA. ASIC is an abbreviation for Application Specific Integrated Circuit. FPGA is an abbreviation for Field-Programmable Gate Array.

The control circuit 21 generates a command requesting a process with respect to the slave device 30 (for example, a command requesting data, a command requesting execution of a predetermined process, or the like) and transmits transmission data including the command to a wireless communication circuit 22 through a transmission packet. The control circuit 21 receives the packet transmitted from the slave device 30 and executes a predetermined process based on the data included in the received packet. That is, the wireless communication performed between the master device 20 and the slave device 30 is packet communication.

The wireless communication circuit 22 includes an RF circuit (not shown) for wirelessly transmitting and receiving packets. The wireless communication circuit 22 has a transmission function of modulating a transmission signal and oscillating the signal at the frequency of an RF signal. The wireless communication circuit 22 has a receiving function of demodulating the received signal. RF is an abbreviation for radio frequency.

The wireless communication circuit 22 modulates the packet containing data transmitted from the control circuit 21 and transmits the packet to the slave device 30 via the antenna 23. The control circuit 21 outputs, to the wireless communication circuit 22, data obtained by encrypting transmission data such as battery information request data using, for example, encryption information exchanged in a connection establishment process described later. The wireless communication circuit 22 adds data necessary for the wireless communication, such as communication control information, to the transmission packet and transmits the transmission packet. The data necessary for the wireless communication includes, for example, an identifier (ID), a sequence number, a next sequence number, an error detection code, and the like. The wireless communication circuit 22 may control data size, communication format, schedule, error detection, or the like of communication between the master device 20 and the slave device 30. The control related to these communications may be performed by the control circuit 21.

The wireless communication circuit 22 receives the packet transmitted from the slave device 30 via the antenna 23 and demodulates the packet. The demodulated packet is transmitted to the control circuit 21. The antenna 23 converts electrical signals into radio waves and radiates the radio waves into space. The antenna 23 receives the radio waves propagating in space and converts the radio waves into electrical signals.

The slave device 30 includes a control circuit (CNT) 31, a wireless communication circuit (WC) 32, and an antenna 33, as shown in FIG. 1. In addition to the above-described elements, the slave device 30 includes an input-output interface or a bus line for wired or wireless communication with devices other than the master device 20. The control circuit 31 has a similar configuration to the control circuit 21 of the master device 20. The control circuit 31 includes, for example, a processor 311 and a memory 312. The memory 312 includes, for example, RAM and ROM.

The control circuit 31 executes the requested process (a response process such as acquiring and returning the requested data, an execution process of the requested process, or the like) based on the requested command acquired via the wireless communication circuit 32. For example, when the requested command, which is included in the received data, is a transmission request for the battery information, the control circuit 31 of the slave device 30 transmits the transmission request to the monitoring device of the corresponding cell stack and acquires the battery information from the monitoring device. As a response to the request, the control circuit 31 transmits data, which is encrypted by using the encryption information including processing result (for example, the acquired battery information), to the wireless communication circuit 32. The control circuit 31 is also capable of controlling devices mounted on the vehicle, for example, according to the requested process.

The wireless communication circuit 32 includes an RF circuit (not shown) for wirelessly transmitting and receiving packets. The wireless communication circuit 32, like the wireless communication circuit 22, has a transmission function and a receiving function. The wireless communication circuit 32 receives the packet transmitted from the master device 20 via the antenna 33 and demodulates the packet. The data, which is included in the demodulated packet, is transmitted to the control circuit 31. The wireless communication circuit 32 modulates the packet containing data transmitted from the control circuit 31 and transmits the packet to the master device 20 via the antenna 33. The wireless communication circuit 32 adds data necessary for the wireless communication, such as communication control information, to the transmission packet and transmits the transmission packet.

The wireless communication circuit 32 may control data size, communication format, schedule, error detection, or the like of communication between the master device 20 and the slave device 30. The control related to these communications may be performed by the control circuit 31. The antenna 33 converts electrical signals into radio waves and radiates the radio waves into space. The antenna 33 receives the radio waves propagating in space and converts the radio waves into electrical signals.

Figure 2:
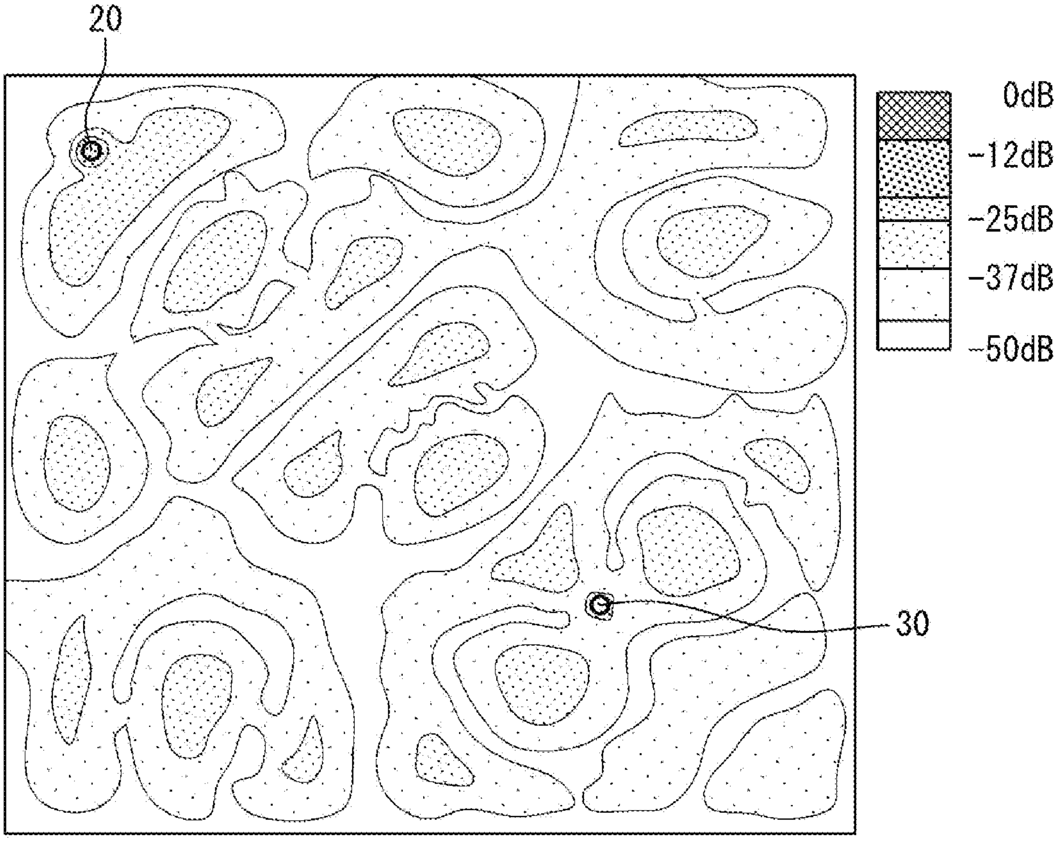
FIG. 2 is a diagram showing an example of electric field intensity distribution in a communication environment between a master device and a slave device.

FIG. 2 is a diagram showing an example of electric field intensity distribution in a communication environment between the master device 20 and the slave device 30. FIG. 2 shows an electromagnetic field simulation result at a predetermined frequency and at predetermined time. Below, the electric field intensity distribution may be referred to as electric field distribution.

The master device 20 and the slave device 30 are disposed at predetermined positions in the vehicle, for example. When a wireless radio wave signal is transmitted at a predetermined frequency from the master device 20 and the slave device 30, which are respectively disposed at predetermined positions, a portion with high electric field intensity and a portion with low electric field intensity are generated in usage environment due to interference between transmission waves and reflected waves or interference with external noise. The reflected waves are caused by reflection from metal elements of the vehicle that are present around the master device 20 and the slave device 30, such as reflection from the vehicle body, reflection from a metal housing, reflection from a harness, and the like. For this reason, in the communication environment between the master device 20 and the slave device 30, there are so-called multiple NULL points, which are portions where the electric field intensity is high and portions where the electric field intensity is low, as shown in FIG. 2.

When the slave device 30 is positioned at or near the portion where the electric field intensity is low in the electric field distribution with the master device 20, there is a high possibility that the slave device 30 is not capable of correctly receiving the radio signal from the master device 20, and a communication error may occur. A communication channel where such a communication error is likely to occur is a communication channel having deteriorated communication quality.

When the master device 20 and the slave device 30 perform the wireless communication via one communication channel that is sequentially selected from the multiple communication channels, the electric field distribution of each communication channel may also be changed because the frequency of each communication channel is different. As a result, the communication quality may vary between each of the communication channels.

Figure 3:
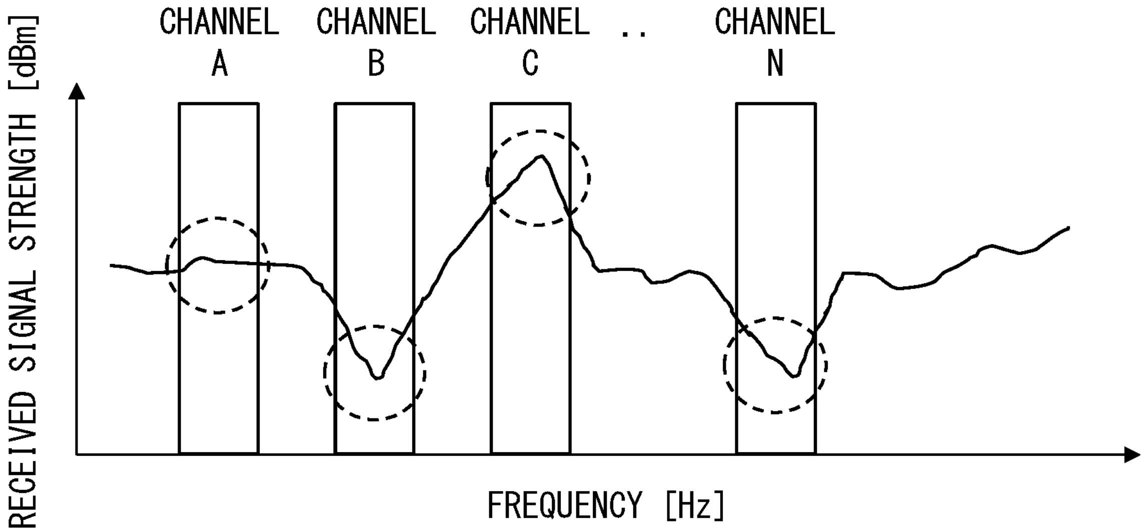
FIG. 3 is a diagram showing an example of received signal strength of each communication channel.

For example, as shown in FIG. 3, in the wireless communication via Communication Channel A, the received electric power (received signal strength), which is one of parameters indicating the communication quality, is good. In the wireless communication via Communication Channel C, the received electric power shows a very high value. Therefore, when the master device 20 and the slave device 30 use Communication Channels A and C with good or very high communication quality, high quality wireless communication with sufficiently limited communication errors may be performed. On the other hand, in the wireless communication via Communication Channels B and N, the received electric power is low. Therefore, when the master device 20 and the slave device 30 use communication channels B and N having deteriorated communication quality, there is a high possibility that a communication error occurs in the wireless communication. In FIG. 3, in order to facilitate understanding, an example of received electric power (received signal strength) with respect to frequency is shown with a solid line.

Therefore, the wireless communication between the master device 20 and the slave device 30 is preferably performed using a communication channel that may perform high quality wireless communication, avoiding a communication channel having deteriorated communication quality.

The electric field distribution between the master device 20 and the slave device 30 is changed depending on the external environment (noise or the like from outside), vibrations (including harness vibration) of the master device 20 and/or the slave device 30, or the like. Therefore, when the master device 20 and/or the slave device 30 are mounted on the vehicle, the electric field distribution in the communication environment between the master device 20 and the slave device 30 is changed depending on, for example, the vibration of the vehicle or the state of the environment around the vehicle, or the like. As a result, a communication channel having good communication quality and a communication channel having deteriorated communication quality are not fixed and may be changed from time to time. Therefore, there is a requirement to monitor the communication quality of each communication channel and set the communication channel where the communication quality has been determined to have deteriorated as a communication channel whose use should be avoided. Regarding the communication channel whose use should be avoided, there is a requirement to restore the deleted communication channel to the multiple communication channels used for the wireless communication according to the improvement in the communication quality of the communication channel that has been deleted from the multiple communication channels used for the wireless communication.

Figure 4:
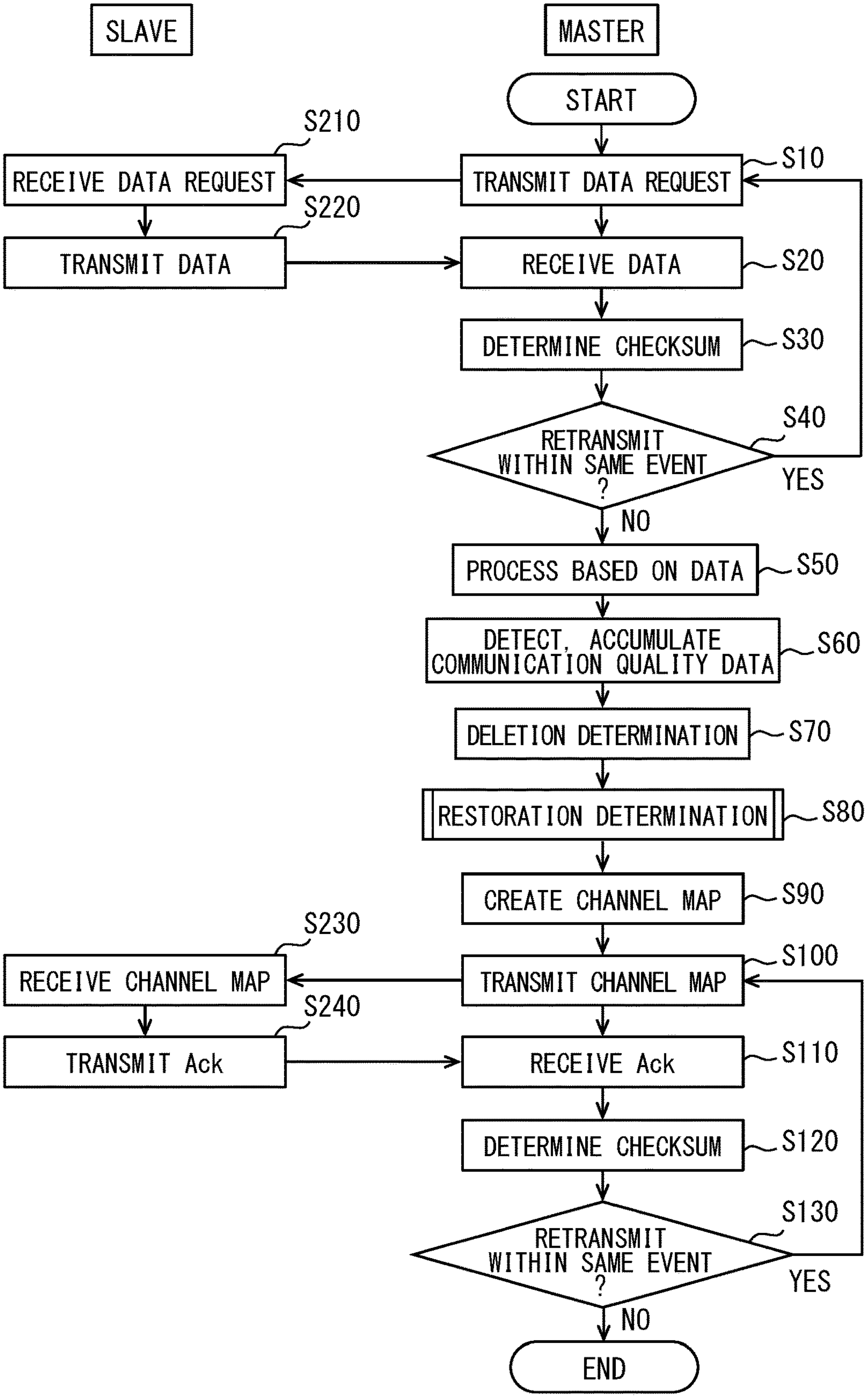
FIG. 4 is a flowchart showing a communication sequence between the master device and the slave device in the first embodiment.

In the wireless communication system 10 of the present embodiment, a control process, which includes deleting a communication channel where the communication quality has been determined to have deteriorated and restoring the deleted communication channel, and the like and is for realizing the wireless communication between the master device 20 and the slave device 30 using a communication channel other than the communication channel having deteriorated communication quality, will be explained with reference to a diagram showing a communication sequence between the master device 20 and the slave device 30 shown in FIG. 4. In FIG. 4, the master device 20 is represented as MASTER, and the slave device 30 is represented as SLAVE.

First, the master device 20 and the slave device 30 execute a connection establishment process before executing the communication sequence shown in FIG. 4. In a case where the wireless communication system 10 is mounted on the vehicle, for example, when an ignition signal (IG) signal is switched from OFF to ON through a user's operation, the connection establishment process is executed. The connection establishment process is executed between the master device 20 and all the slave devices 30, which are connection targets for the wireless communication with the master device 20. When the master device 20 and the slave device 30 are always connected, the connection establishment process is performed only once at predetermined time. When an error occurs during the communication and the wireless communication connection between the master device 20 and the slave device 30 is disconnected, the connection establishment process may be performed for reconnection. At least one communication channel used for a connection establishment process of establishing a communication connection between the master device 20 and the slave device 30 corresponds to a first channel group. At least one communication channel used for a communication process of performing data communication between the master device 20 and the slave device 30 corresponds to a second channel group.

In the connection establishment process, for example, the slave device 30 executes an advertisement operation of transmitting an advertisement signal via an advertising communication channel, and the master device 20 executes a scan operation of scanning the advertisement signal. The advertising communication channel includes multiple communication channels (for example, three in the case of Bluetooth LE). When the master device 20 receives the advertisement signal through the scan operation, the master device 20 transmits a connection request to the slave device 30 in which the advertisement signal is transmitted. Accordingly, the communication connection is established between the master device 20 and the slave device 30. After the communication connection is established, the master device 20 and the slave device 30 exchange the encryption information and perform a process of sharing initial information related to frequency channel hopping. The initial information includes, for example, a hopping pattern or a function for hopping, and the like.

When the connection establishment process is ended, the master device 20 and the slave device 30 execute data communication via data communication channels that are sequentially selected from the multiple communication channels for each communication event that occurs periodically. In the case of Bluetooth LE, thirty-seven communication channels are prepared as the data communication channels. For example, as shown in FIG. 4, in step S10, the master device 20 transmits a data request command, that is, a data request, to the slave device 30. When the slave device 30 receives the data request in step S210, the slave device 30 executes a predetermined process necessary for responding, that is, a process of acquiring and transmitting the requested data, in step S220.

For each communication event, the master device 20 and the slave device 30 perform the frequency channel hopping to switch data communication channels to be used, and transmit and receive the data request and transmit and receive the requested data. At this time, the master device 20 and the slave device 30 determine the communication channel to be switched by the frequency channel hopping according to a channel map described later.

The master device 20 receives the requested data in step S20. In step S30, the master device 20 performs, for example, a checksum determination based on the error detection code included in the received data in order to confirm whether the data has been correctly received. In the following step S40, the master device 20 determines whether to execute a process for retransmission within the same communication event when a determination is made in the process of step S30 that the data has not been correctly received. For example, the master device 20 can determine to perform retransmission when there is enough time to perform the retransmission until the end time of the current communication event and can determine not to perform retransmission when there is no time. In step S40, when the master device 20 determines to perform retransmission, the master device 20 re-executes the process from step S10. When a determination is made in the process of step S30 that the data has been correctly received, or when a determination is made in step S40 that the retransmission is not performed, the master device 20 proceeds to the process of step S50.

In step S50, the master device 20 executes the process based on the information included in the received data. When a determination is made in the process of step S30 that the data has not been correctly received, and when a determination is made in step S40 that the retransmission is not performed, the process of step S50 may be omitted, and the process of step S50 may be executed based on the previously received data.

In step S60, the master device 20 detects received signal strength (RSSI) and a packet error rate (PER) as characteristic data indicating the communication quality of the signal received from the slave device 30. PER is a rate indicating a ratio of the number of error packets to the number of packets received by the master device 20 as a percentage. The master device 20 may detect signal-to-noise ratio (SNR)/signal interference-to-noise ratio (SINR) instead of RSSI. For example, the SNR/SINR can be detected by the master device 20 based on the ratio of an RSSI value when a radio signal from the slave device 30 is received and an RSSI value when a radio signal is not received. The master device 20 may detect a bit error rate (BER) instead of PER. The master device 20 stores and accumulates the detected RSSI or SNR/SINR and the PER or BER for each communication channel. The characteristic data, which indicates the communication quality, can also be acquired by the slave device 30 detecting the RSSI, PER, or the like when a signal from the master device 20 is received and transmitting the RSSI, PER, or the like to the master device 20 in addition to or instead of the master device 20 detecting as described above. Step S60 corresponds to a detection unit and a detection step.

In step S70, the master device 20 determines deterioration in the communication quality of the communication channel based on the characteristic data indicating the communication quality detected in step S60. For example, the master device 20 respectively compares RSSI or SNR/SINR and PER or BER with a deletion threshold for determining deterioration in the communication quality. When at least one type of characteristic data satisfies the deletion threshold, the corresponding communication channel is deleted from the multiple communication channels used for the wireless communication between the master device 20 and the slave device 30. The communication channel to be deleted is a data communication channel. In this way, the communication channel having deteriorated communication quality is deleted from the communication channel used for the wireless communication. The step S70 corresponds to a deletion unit and a deletion step.

In step S80, the master device 20 executes a restoration determination of the deleted communication channel corresponding to the deletion determination during the time of previous communication events. Specifically, the master device 20 determines the restorability of the deleted communication channel to the multiple communication channels used for the wireless communication based on the characteristic data of a neighboring communication channel of the deleted communication channel. Usually, the communication quality of the neighboring communication channel has a correlation with the communication quality of the deleted communication channel because the frequencies are close. Therefore, based on the characteristic data of the neighboring communication channel that is close in frequency, restorability of the deleted communication channel can be determined with high accuracy. A restoration determination process for the deleted communication channel will be explained in detail later. The communication channel, which is determined to be restored as a communication channel used for the wireless communication, is actually used for the wireless communication between the master device 20 and the slave device 30. In a case where the communication quality of the communication channel when actually used for the wireless communication remains deteriorated, the communication channel may again be the target of the deletion determination. The step S80 corresponds to a determination unit and a determination step.

In step S90, the master device 20 creates a channel map based on the results of the deletion determination in step S70 and the restoration determination in step S80. The channel map may indicate a usable communication channel for the wireless communication or may indicate an unusable communication channel. The channel map may indicate both the usable communication channel and the unusable communication channel. When there is a change in the usable/unusable communication channels due to the creation of the channel map, a frequency channel hopping pattern may be updated. When the frequency channel hopping pattern is not updated, or when the communication channel scheduled for hopping is unusable, for example, the communication channel scheduled next for hopping may be used.

In step S100, the master device 20 transmits the created channel map to the slave device 30. In step S230, the slave device 30 receives the channel map transmitted from the master device 20. In step S240, the slave device 30 returns a received confirmation signal (Ack signal) to the master device 20. In step S110, the master device 20 receives the Ack signal from the slave device 30. In step S120, the master device 20 performs, for example, the checksum determination based on the error detection code included in the received Ack signal in order to confirm whether the Ack signal has been correctly received. In the following step S130, the master device 20 determines whether to execute a process for retransmission within the same communication event when a determination is made in the process of step S120 that the data has not been correctly received. In step S130, when the master device 20 determines to perform retransmission, the master device 20 re-executes the process from step S100. When a determination is made in the process of step S120 that the data has been correctly received, or when a determination is made in step S130 that the retransmission is not performed, the master device 20 ends the process shown in the flowchart in FIG. 4.

In this way, the master device 20 and the slave device 30 perform a process of sharing the channel map. The master device 20 may perform the processes from steps S70 to S130 described above for each communication event or may perform each time multiple communication events pass.

Next, the restoration determination process of the deleted communication channel in step S80 will be described in detail with reference to the flowchart in FIG. 5. The flowchart in FIG. 5 shows in detail an example of the restoration determination process for the deleted communication channel.

Figure 6:
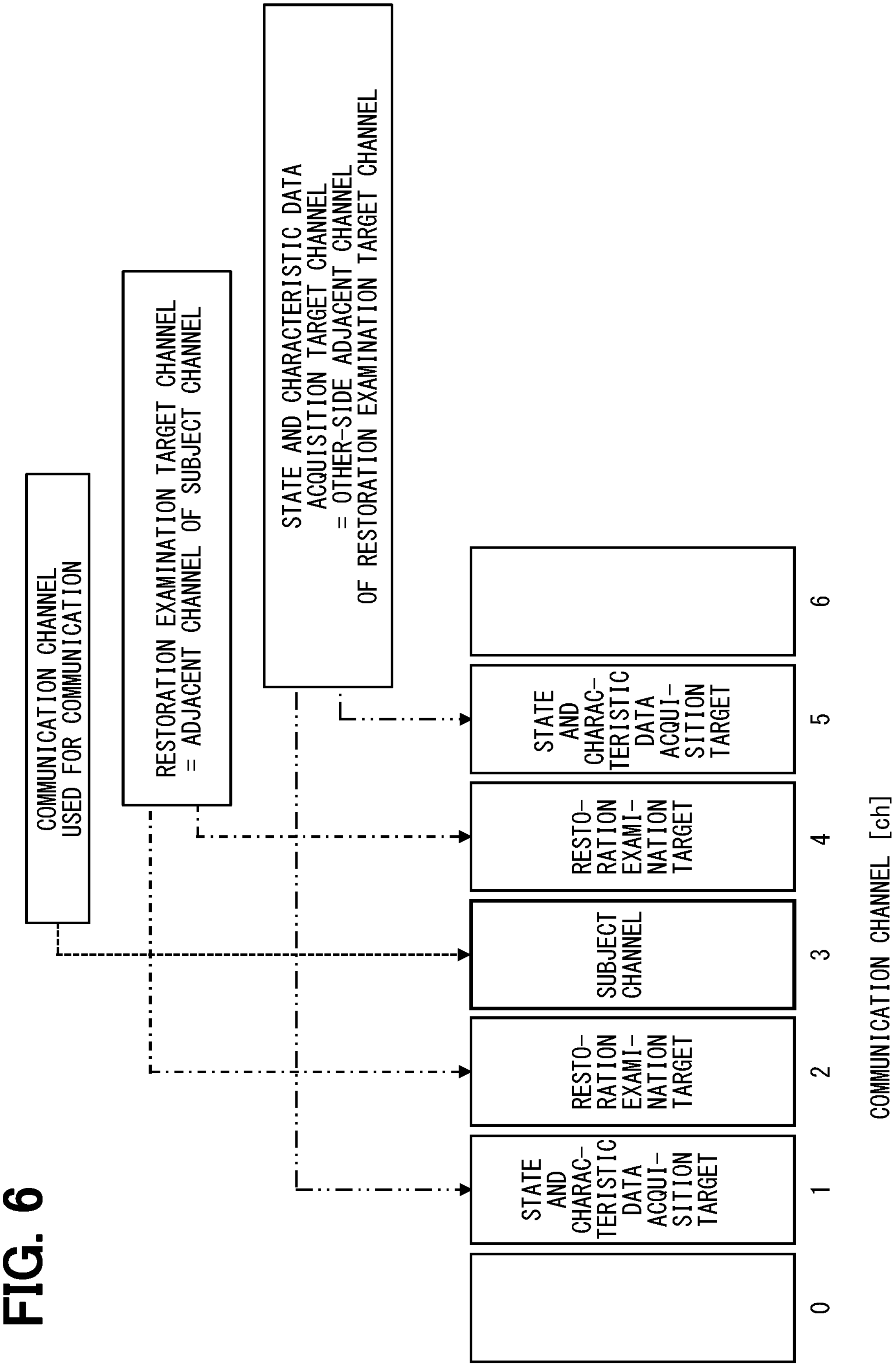
FIG. 6 is a diagram showing a relationship between a communication channel, which is a restoration examination target, and a neighboring communication channel in the restoration determination process of the first embodiment.

In the present embodiment, restorability of the deleted communication channel is determined based on the characteristic data of the neighboring communication channel that is close in frequency to the deleted communication channel. Therefore, as shown in FIG. 6, the master device 20 defines the communication channel, which is actually used for the communication by the master device 20 and the slave device 30, as a subject channel (Channel 3, in the example in FIG. 6) and defines both-side adjacent channels (Channels 2 and 4, in the example in FIG. 6), which are close in frequency to the subject channel, as communication channels that are restoration examination targets. Other-side adjacent channels (Channels 1 and 5, in the example in FIG. 6), which are on the other side of the communication channels that are restoration examination targets and are on the opposite side of the subject channel, are defined as targets for acquiring the state and the characteristic data. The state of the other-side adjacent channel indicates whether the communication channel is usable for the wireless communication or indicates whether the communication channel has been deleted from the multiple communication channels used for the wireless communication. When the other-side adjacent channel is usable for the wireless communication, the characteristic data of the other-side adjacent channel is also acquired.

Figure 5:
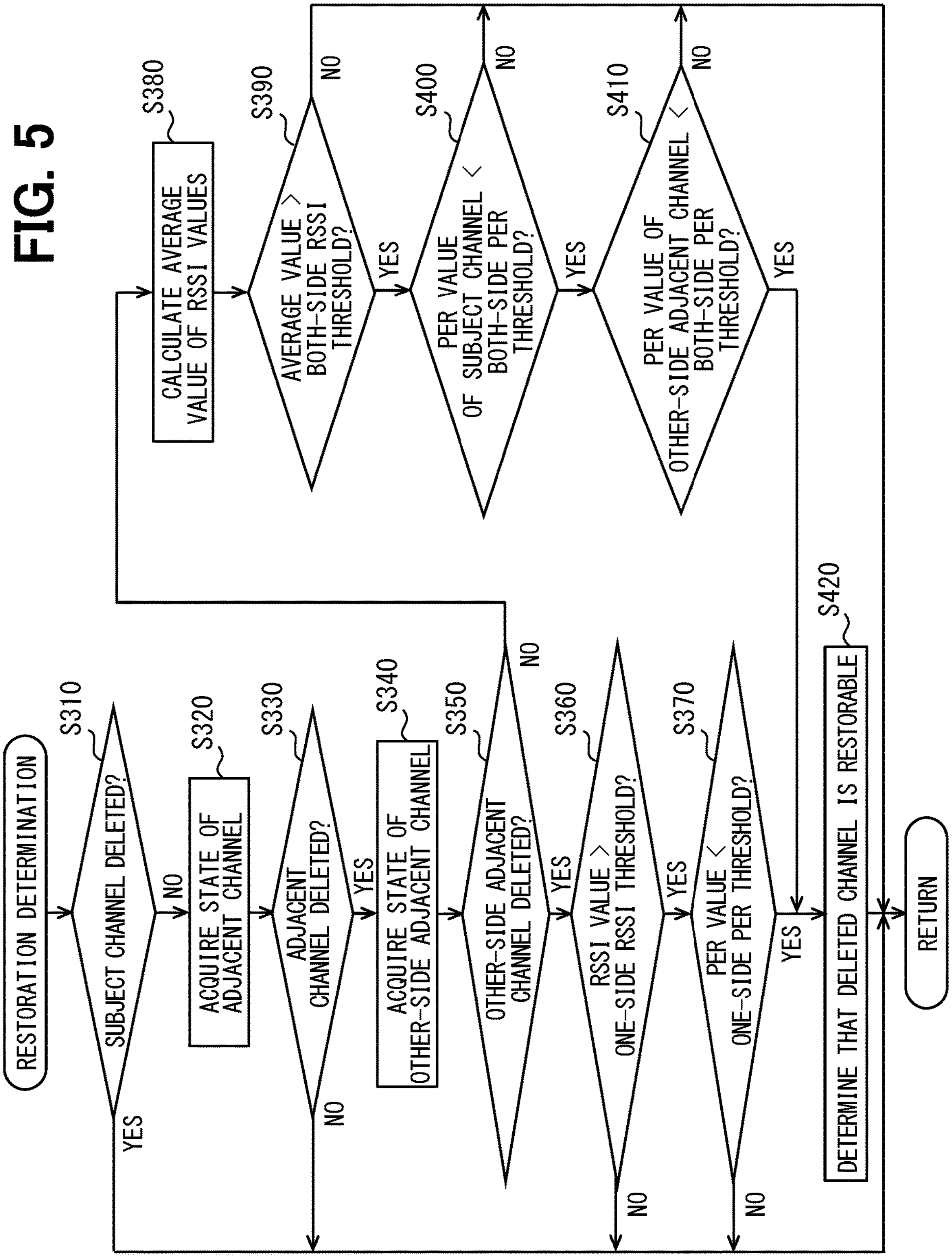
FIG. 5 is a flowchart showing a detailed example of a restoration determination process of the communication channel in the first embodiment.
Figure 7:
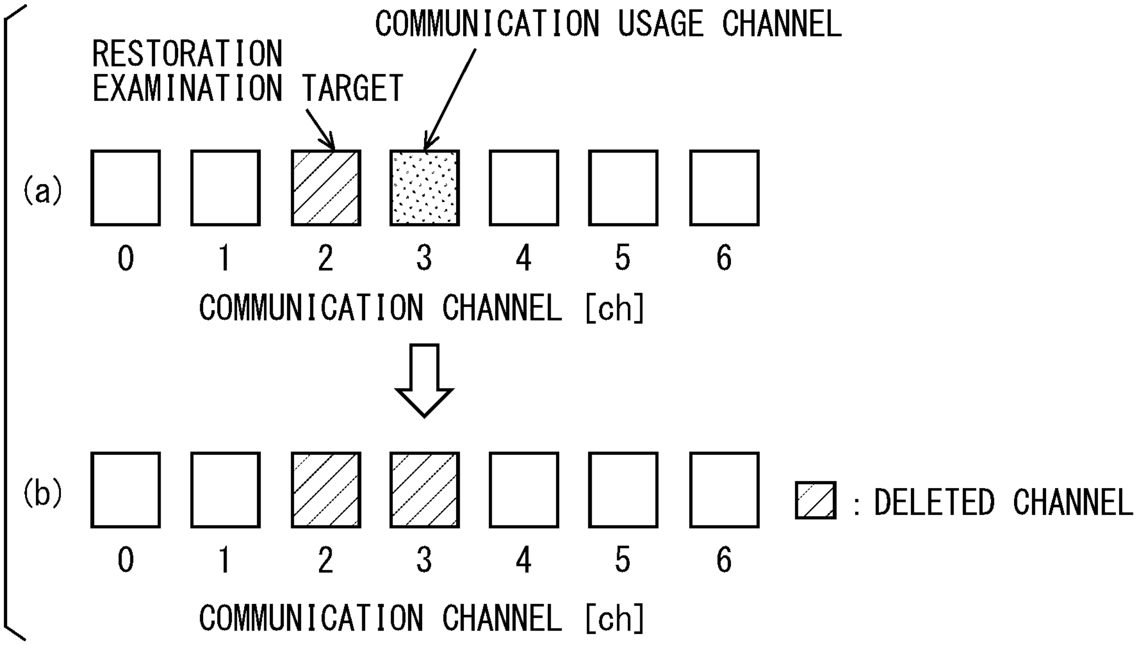
FIG. 7 is a diagram showing that Channel 3 is deleted from multiple communication channels.

In step S310 of the flowchart in FIG. 5, the master device 20 first determines whether the subject channel is deleted from the multiple communication channels used for the wireless communication in the deletion determination process of step S70. As shown in (a) and (b) of FIG. 7, when the subject channel is deleted in the deletion determination process, a determination of the improvement in the communication quality of adjacent channels based on the characteristic data of the subject channel is difficult. Therefore, when the master device 20 determines that the subject channel is deleted from the multiple communication channels used for the wireless communication, the process shown in the flowchart in FIG. 5 is ended without performing any further restoration determination process. (a) of FIG. 7 shows that Channel 3 is used as a communication channel, and (b) of FIG. 7 shows that Channel 3 is deleted from the multiple communication channels used for the wireless communication through the deletion determination process because the communication quality in the wireless communication using Channel 3 is low.

On the other hand, when the master device 20 determines in step S310 that the subject channel is not deleted, the process proceeds to step S320. In step S320, the master device 20 acquires states of the both-side adjacent channels of the subject channel, which are restoration examination targets, that is, states indicating whether the both-side adjacent channels have been deleted or are usable. In step S330, the master device 20 determines whether the adjacent channel has been deleted based on the acquired state of the adjacent channel, which is a restoration examination target.

Figure 8:
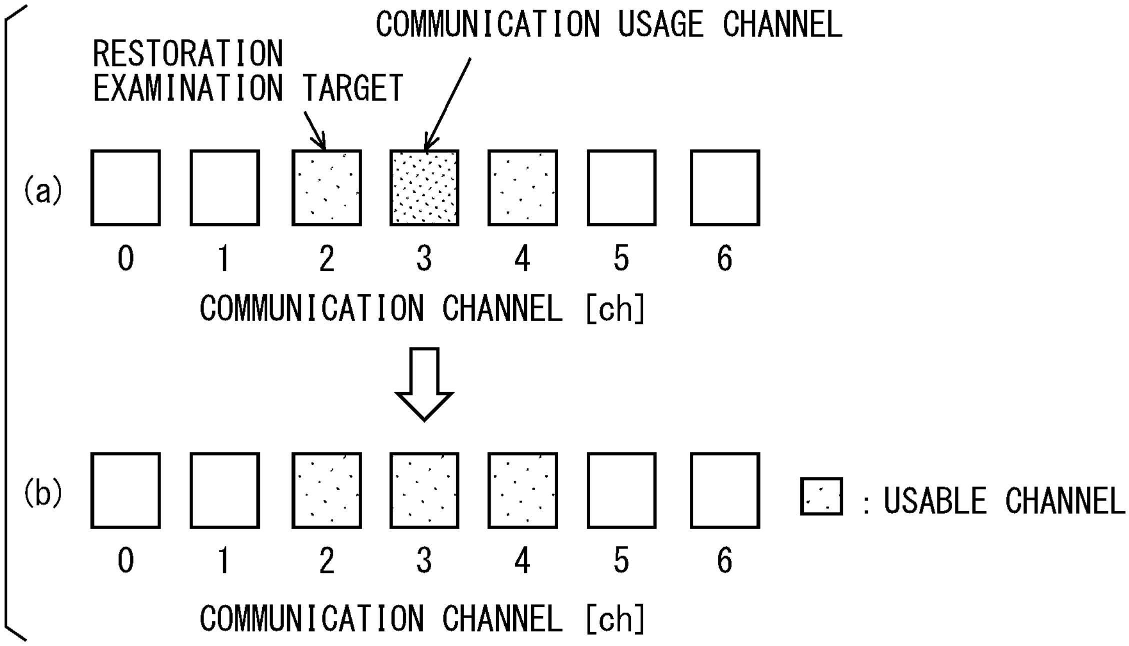
FIG. 8 is a diagram showing a state in which Channel 3 and Channel 2 and Channel 4 are all usable for the wireless communication.

For example, as shown in (a) and (b) of FIG. 8, when the both-side adjacent channels of the subject channel have not been deleted and are usable, there is no need to perform the restoration determination process. Therefore, when the master device 20 determines in step S330 that the both-side adjacent channels of the subject channel have not been deleted, the master device 20 ends the process shown in the flowchart in FIG. 5 without performing any further restoration determination process. (a) of FIG. 8 shows that Channel 3 is used as a communication channel, and (b) of FIG. 8 shows a state in which Channel 3 (subject channel), which is used for the wireless communication, and the both-side adjacent channels (Channel 2 and Channel 4) of the subject channel are all usable for the wireless communication. That is, (b) of FIG. 8 is a diagram showing a state in which Channel 3, which is used for the wireless communication, and Channel 2 and Channel 4, which are on both sides of Channel 3, are all usable for the wireless communication.

On the other hand, when the master device 20 determines in step S330 that at least one of the adjacent channels has been deleted, the process proceeds to steps S340 and subsequent steps. That is, in the present embodiment, in a case where the wireless communication is performed between the master device 20 and the slave device 30 via any communication channel when the communication channel, which is adjacent to the communication channel (subject channel) used for the wireless communication, has been deleted, the master device 20 executes the restoration determination process from step S340 and subsequent steps using the deleted communication channel as a restoration examination target.

In step S340, the master device 20 acquires the state of the other-side adjacent channel, which is on the other side of the deleted adjacent channel (restoration examination target) and is on the opposite side of the subject channel, and when the other-side adjacent channel is usable for the wireless communication, the master device 20 acquires the characteristic data indicating the communication quality of the other-side adjacent channel. For example, in the example shown in FIG. 6, when the adjacent Channel 2, which is a restoration examination target, has been deleted, the master device 20 acquires the state of Channel 1, which is the other-side adjacent channel of the adjacent Channel 2 and when Channel 1 has not been deleted, the master device 20 acquires the characteristic data of Channel 1. When the adjacent Channel 4, which is a restoration examination target, has been deleted, the master device 20 acquires the state of Channel 5, which is the other-side adjacent channel of the adjacent Channel 4 and when Channel 5 has not been deleted, the master device 20 acquires the characteristic data of Channel 5.

In step S350, a determination is made whether the other-side adjacent channel has been deleted based on the state of the other-side adjacent channel acquired in step S340. In this step S350, when the adjacent channel, which is a restoration examination target, has been deleted, the other-side adjacent channel, which is on the other side of the channel of the restoration examination target and is on the opposite side of the subject channel, is determined. Therefore, when the both-side adjacent channels of the subject channel have been deleted, a determination in step S350 is performed separately for the two other-side adjacent channels. In step S350, when a determination is made that the other-side adjacent channel has been deleted, the master device 20 proceeds to the process of step S360. On the other hand, in step S350, when a determination is made that the other-side adjacent channel has not been deleted and is usable for the wireless communication, the master device 20 proceeds to the process of step S380.

Figure 9:
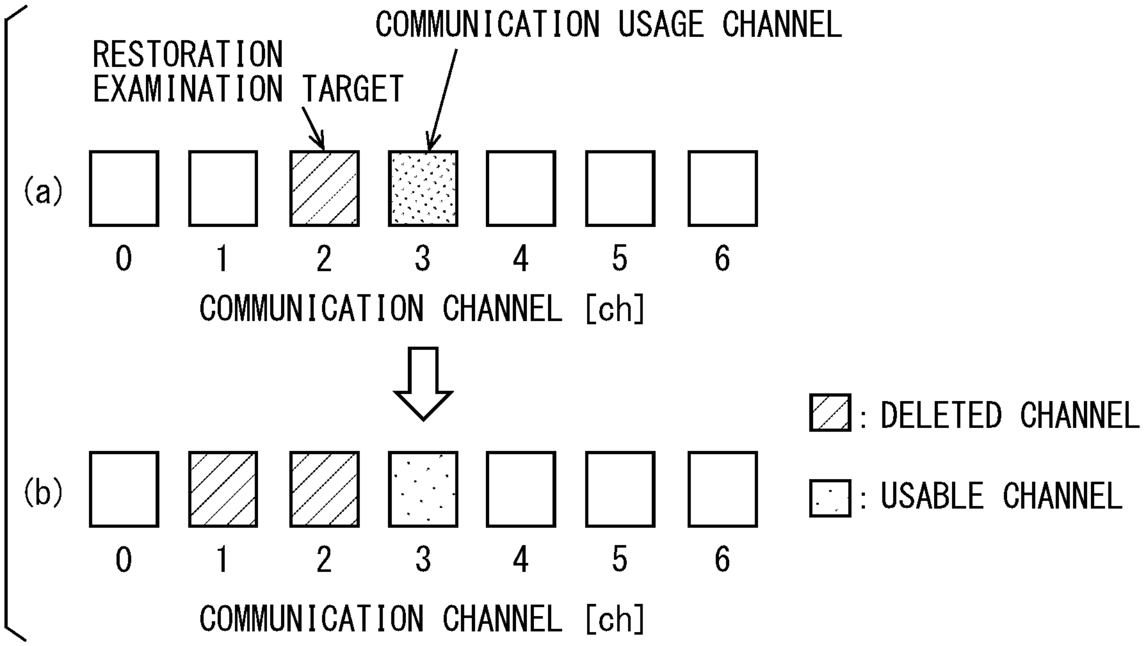
FIG. 9 is a diagram showing a case where although Channel 3 is maintained to be usable for the wireless communication, Channel 2 and Channel 1 are deleted through the deletion determination process.

(a) and (b) of FIG. 9 show a case in which the other-side adjacent channel has been deleted. That is, (a) of FIG. 9 shows that Channel 3 is used as a communication channel, and (b) of FIG. 9 shows a case where although Channel 3 (subject channel), which is used for the wireless communication, is maintained to be usable because deterioration in communication quality is not determined in the wireless communication, the other-side adjacent channel (Channel 1) of the adjacent channel (Channel 2), which is a restoration examination target, is deleted through the deletion determination process. In this case, restorability of the adjacent channel (Channel 2), which is a restoration examination target, is determined based only on the characteristic data of the subject channel (Channel 3) that is usable for the wireless communication. That is, (b) of FIG. 9 is a diagram showing a case where although Channel 3, which is used for the wireless communication, is maintained to be usable for the wireless communication, Channel 2, which is a restoration examination target, and Channel 1, which is other-side adjacent channel of Channel 2, are deleted through the deletion determination process.

Figure 10:
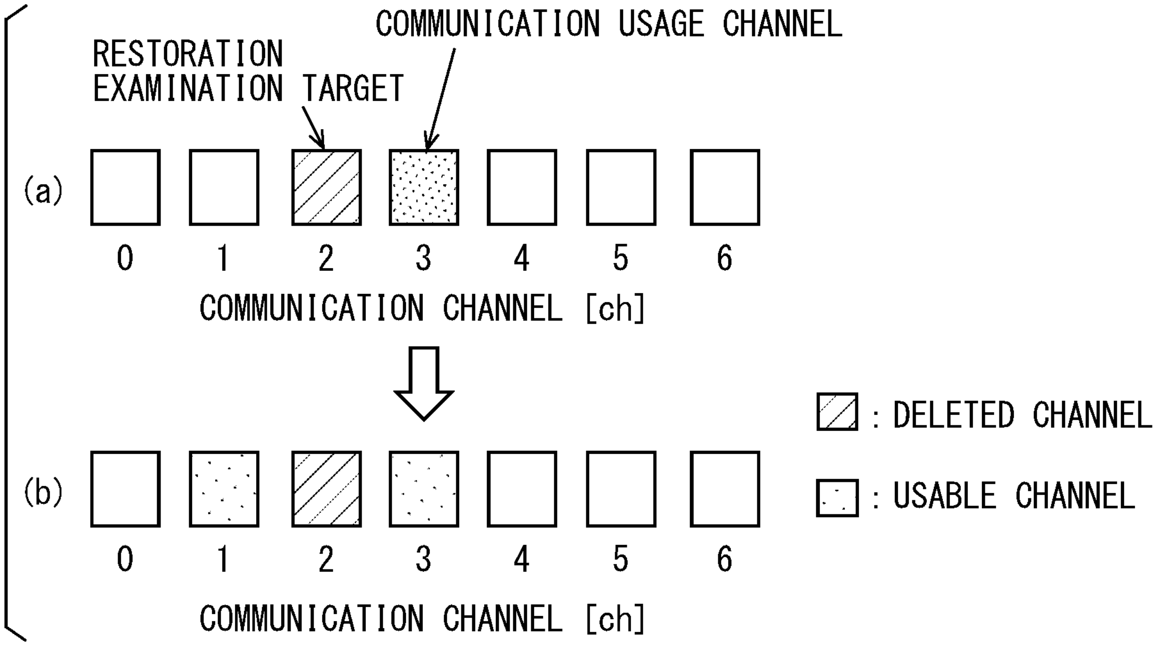
FIG. 10 is a diagram showing a case where Channel 3 is maintained to be usable for the wireless communication, Channel 2 is deleted, and Channel 1 is usable for the wireless communication.

(a) and (b) of FIG. 10 show a case in which the other-side adjacent channel has not been deleted and is usable for the wireless communication. That is, (a) of FIG. 10 shows that Channel 3 is used as a communication channel, and (b) of FIG. 10 shows a case where Channel 3 (subject channel), which is used for the wireless communication, is maintained to be usable because deterioration in the communication quality is not determined in the wireless communication, the adjacent channel (Channel 2) of the subject channel, which is a restoration examination target, has been deleted, and the other-side adjacent channel (Channel 1) is usable for the wireless communication. In this case, restorability of the adjacent channel (Channel 2), which is a restoration examination target, is determined based on the characteristic data of the subject channel (Channel 3) and the other-side adjacent channel (Channel 1), which are usable for the wireless communication. That is, (b) of FIG. 10 is a diagram showing a case where Channel 3, which is used for the wireless communication, is maintained to be usable for the wireless communication, Channel 2, which is a restoration examination target, is deleted, and Channel 1, which is other-side adjacent channel of Channel 2, is usable for the wireless communication.

In the present embodiment, restorability of the deleted communication channel is determined according to different determination standards of a case where only one-side communication channel adjacent to the deleted communication channel, which is a restoration examination target, is usable for the wireless communication and a case where both-side communication channels adjacent to the deleted communication channel, which is a restoration examination target, are usable for the wireless communication. Examples of the respective determination standards for a case where only one-side communication channel is usable for the wireless communication and a case where both-side communication channels are usable for the wireless communication will be described below.

In step S350, steps S360 and S370, which are executed when a determination is made that the other-side adjacent channel has been deleted, show examples of the determination standard when only one-side communication channel (that is, the subject channel) is usable for the wireless communication. In step S360, a determination is made whether the RSSI value, which is one of the characteristic data of the usable one-side communication channel (that is, the subject channel), is larger than a one-side RSSI threshold. In step S370, a determination is made whether the PER value, which is another one of the characteristic data of the usable one-side communication channel (that is, the subject channel), is smaller than a one-side PER threshold. The larger the RSSI value, the better the communication quality, and the smaller the PER value, the better the communication quality. The RSSI value and the PER value may be an RSSI value and a PER value detected in step S60 when the subject channel has been used for the previous wireless communication, may be values obtained by averaging each of a predetermined number of RSSI values and PER values detected in multiple past wireless communications, or may be median values thereof.

Figure 11:
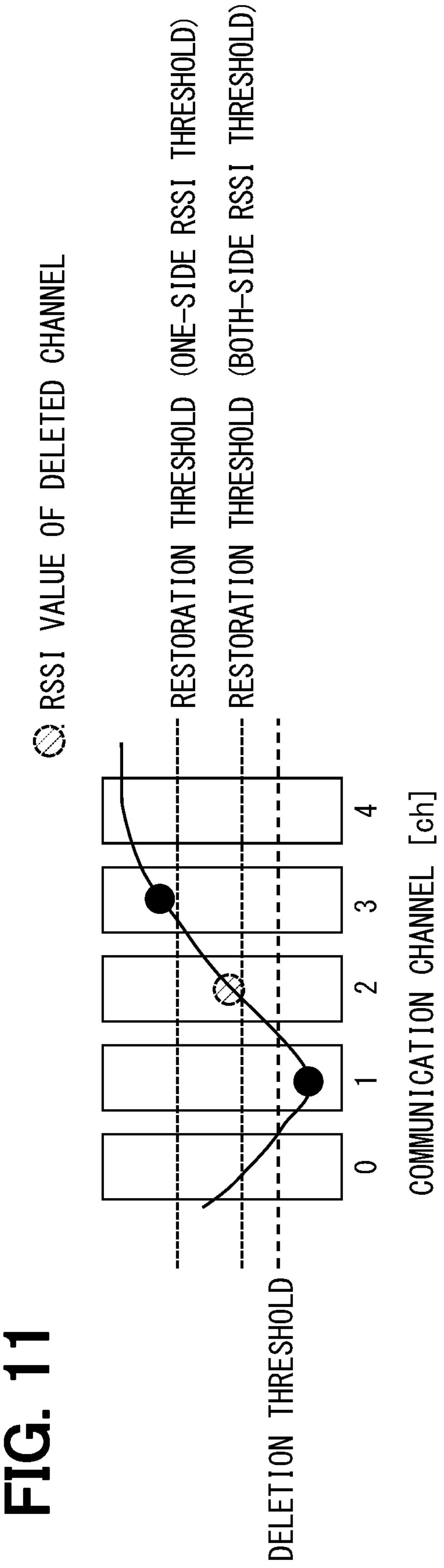
FIG. 11 is a diagram showing an example of a relationship between an RSSI value of each communication channel and a one-side RSSI threshold and a both-side RSSI threshold when only one-side communication channel adjacent to the deleted communication channel, which is a restoration examination target, is usable for the wireless communication.

FIG. 11 shows an example of a relationship between the RSSI value and the one-side RSSI threshold and the both-side RSSI threshold when only one-side communication channel adjacent to the deleted communication channel, which is a restoration examination target, is usable for the wireless communication. The one-side RSSI threshold is a threshold for determining restorability when only one-side communication channel of both-side communication channels adjacent to the deleted communication channel, which is a restoration examination target, is usable for the wireless communication. The both-side RSSI threshold is a threshold for determining restorability when both-side communication channels adjacent to the deleted communication channel, which is a restoration examination target, are both usable for the wireless communication.

When the only one-side communication channel adjacent to the deleted communication channel, which is a restoration examination target, is usable for the wireless communication, as described above, restorability of the adjacent channel, which is a restoration examination target, is determined based only on the characteristic data of the one-side communication channel (subject channel) that is usable for the wireless communication. Therefore, as shown in FIG. 11, for example, the one-side RSSI threshold is set to be relatively large compared to the both-side RSSI threshold to the extent that the RSSI value of the adjacent channel (Channel 2), which is a restoration examination target, is determined to be improved to at least the deletion threshold or more. In step S360, the master device 20 determines whether the RSSI value of the one-side communication channel (subject channel), which is usable for the wireless communication, satisfies (exceeds) the one-side RSSI threshold set to be relatively large in this way. The one-side PER threshold in step S370 is also set to be relatively small compared to the both-side PER threshold based on the same idea as the one-side RSSI threshold in step S360. In step S370, the master device 20 determines whether the PER value of the one-side communication channel (subject channel), which is usable for the wireless communication, satisfies (below) the one-side PER threshold.

When a determination is made that the RSSI value does not satisfy the one-side RSSI threshold in step S360, or when a determination is made that the PER value does not satisfy the one-side PER threshold in step S370, the master device 20 determines that the adjacent channel, which is a restoration examination target, is not restorable and ends the process shown in the flowchart in FIG. 5. On the other hand, when a determination is made that the RSSI value satisfies the one-side RSSI threshold in step S360, and when a determination is made that the PER value satisfies the one-side PER threshold in step S370, the master device 20 determines that the deleted adjacent channel, which is a restoration examination target, is restorable in step S420. Thereafter, the master device 20 ends the process shown in the flowchart in FIG. 5 and returns to the process shown in the flowchart in FIG. 4. In steps S360 and S370, although two types of characteristic data (RSSI value and PER value) are compared with respective one-side thresholds, the number of characteristic data to be compared with the one-side threshold may be one type or three or more types.

On the other hand, in step S350, steps S380, S390, S400, and S410, which are executed when a determination is made that the other-side adjacent channel has not been deleted, show examples of the determination standard when both-side communication channels (that is, the subject channel, and the other-side adjacent channel) are both usable for the wireless communication.

Figure 12:
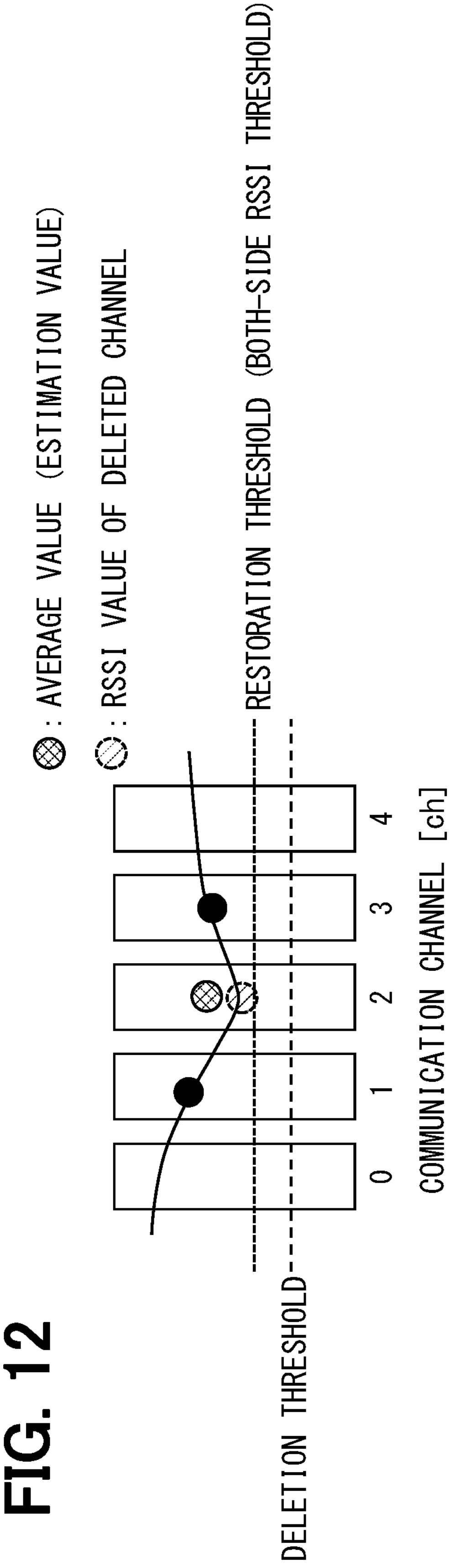
FIG. 12 is a diagram showing an example of a relationship between the RSSI value of each communication channel and the both-side RSSI threshold when both-side communication channels of the deleted communication channel, which is a restoration examination target, are both usable for the wireless communication.

When both-side communication channels of the deleted communication channel, which is a restoration examination target, are both usable for the wireless communication, for example, as shown in FIG. 12, there is also a high possibility that the RSSI value of the adjacent channel (Channel 2), which is a restoration examination target, shows an RSSI value larger than the deletion threshold. Therefore, the both-side RSSI threshold shown in FIG. 12 is set to a relatively smaller value than the one-side RSSI threshold described above.

In step S380, the master device 20 calculates an average value of the respective RSSI values of the subject channel and the other-side adjacent channel. The RSSI value of the other-side adjacent channel is detected when the wireless communication is performed by using the other-side adjacent channel and is based on the stored RSSI value. In step S390, the master device 20 determines whether the RSSI average value, which is calculated in step S380, satisfies (exceeds) the both-side RSSI threshold, which is set to be relatively smaller than the one-side RSSI threshold.

In step S400, the master device 20 determines whether the PER value of the subject channel, which is one of the both-side communication channels that are usable for the wireless communication, satisfies (below) the both-side PER threshold, which is set to be relatively larger than the one-side PER threshold. In step S410, a determination is made whether the PER value of the other-side adjacent channel, which is another one of the both-side communication channels that are usable for the wireless communication, satisfies (below) the both-side PER threshold, which is set to be relatively larger than the one-side PER threshold.

When a determination is made that the RSSI average value does not satisfy the both-side RSSI threshold in step S390, when a determination is made that the PER value of the subject channel does not satisfy the both-side PER threshold in step S400, or when a determination is made that the PER value of the other-side adjacent channel does not satisfy the both-side PER threshold in step S410, the master device 20 determines that the adjacent channel, which is a restoration examination target, is not restorable, and ends the process shown in the flowchart in FIG. 5. On the other hand, when a determination is made that the RSSI average value satisfies the both-side RSSI threshold in step S390, when a determination is made that the PER value of the subject channel satisfies the both-side PER threshold in step S400, and when a determination is made that the PER value of the other-side adjacent channel satisfies the both-side PER threshold in step S410, the master device 20 proceeds to step S420 and determines that the deleted adjacent channel, which is a restoration examination target, is restorable. Thereafter, the master device 20 ends the process shown in the flowchart in FIG. 5 and returns to the process shown in the flowchart in FIG. 4.

In steps S380 and S410, although two types of characteristic data (RSSI value and PER value) are respectively compared with the thresholds, the number of characteristic data to be compared with the threshold may be one type or three or more types. In the example above, regarding the RSSI value, although the average value of the RSSI value of the subject channel and the RSSI value of the other-side adjacent channel is calculated, and the calculated RSSI average value is compared with the both-side RSSI threshold, the RSSI value of the subject channel and the RSSI value of the other-side adjacent channel may be compared with both-side RSSI threshold, respectively. In the example above, regarding the PER value, although the PER value of the subject channel and the PER value of the other-side adjacent channel are respectively compared with the both-side PER threshold, the average value of the PER value of the subject channel and the PER value of the other-side adjacent channel may be calculated, and the calculated PER average value may be compared with the both-side PER threshold. In the example above, although two types of characteristic data (RSSI value and PER value) are respectively compared with the thresholds, a determination may be made that the deleted communication channel is restorable to the multiple communication channels used for the wireless communication with a fact that the both-side communication channels, which are restoration examination targets, are usable for the wireless communication.

In this way, according to the present embodiment, restorability of the deleted communication channel, which has been deleted from the multiple communication channels used for the wireless communication, is determined based on the characteristic data of the adjacent one-side or both-side communication channels that are close in frequency to the deleted communication channel. Usually, the communication quality of the adjacent communication channel has a correlation with the communication quality of the deleted communication channel because the frequencies are close. Therefore, based on the characteristic data of the adjacent communication channel that is close in frequency, restorability of the deleted communication channel can be determined with high accuracy.

Second Embodiment

Next, a wireless communication system and a wireless communication method according to a second embodiment of the present disclosure will be described with reference to the drawings. The wireless communication system according to the present embodiment is configured in the same manner as the wireless communication system according to the first embodiment, so a description regarding the configuration will be omitted.

The wireless communication system according to the present embodiment and the wireless communication system according to the first embodiment differ only in the restoration determination process of the communication channel. Therefore, the restoration determination process, which is performed in the wireless communication system according to the present embodiment, will be described below with reference to the flowcharts in FIGS. 13 and 14. In the restoration determination process shown in the flowcharts in FIGS. 13 and 14, the processes of steps S352, S354, S356, S358, S381, S382, S383, S384, and S385 are added with respect to the restoration determination process shown in the flowchart in FIG. 5. Therefore, the following description will focus on the processes added to the flowcharts in FIGS. 13 and 14.

Figure 15:
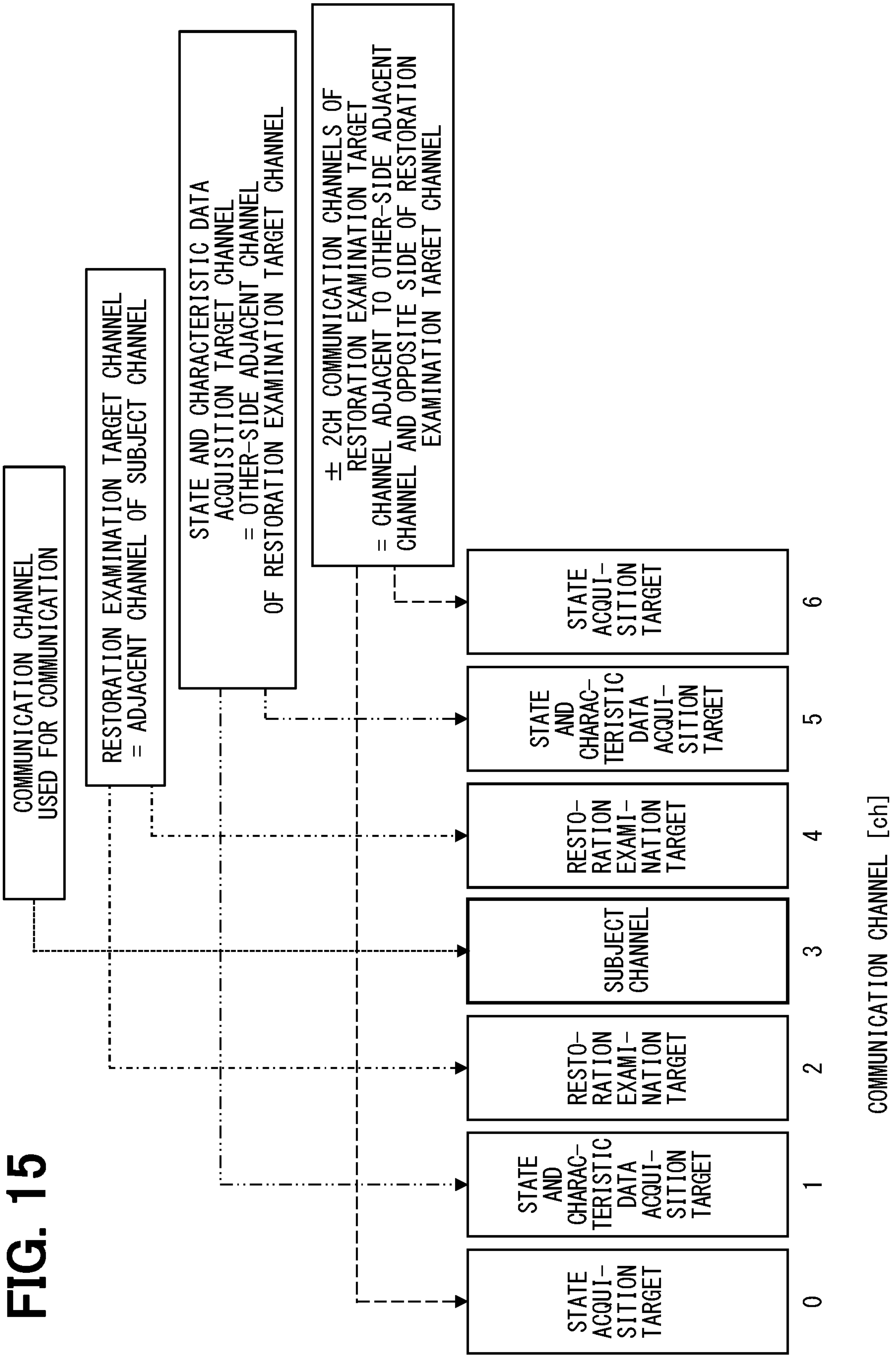
FIG. 15 is a diagram showing a relationship between the communication channel, which is a restoration examination target, and the neighboring communication channel in the restoration determination process of the second embodiment.

In step S352, states of ±2CH communication channels of the deleted channel, which is a restoration examination target, are acquired. For example, as shown in FIG. 15, when the deleted channel, which is a restoration examination target, is Channel 2, the ±2CH communication channels correspond to Channel 0 and Channel 4, and when the deleted channel, which is a restoration examination target, is Channel 4, the ±2CH communication channels correspond to Channel 2 and Channel 6. The states of Channel 2 and Channel 4 have been acquired in step S320, so after all, in step S352, when the restoration examination target is Channel 2, the state of Channel 0 is acquired, and/or when the restoration examination target is Channel 4, the state of Channel 6 is acquired. The ±2CH communication channels can be defined as communication channels (Channels 0 and 4 for Channel 2, Channels 2 and 6 for Channel 4) that are respectively adjacent to the both-side communication channels (Channels 1 and 3 for Channel 2, Channels 3 and 5 for Channel 4) of the deleted channels (Channels 2 and 4) and that are on the opposite side of the deleted channels (Channels 2 and 4), which are restoration examination targets.

In step S354, the master device 20 determines whether states of neighboring communication channels that are close in frequency to the deleted channel, which is a restoration examination target, specifically, states of ±1CH communication channels and ±2CH communication channels of the deleted channel, which is a restoration examination target, correspond to a threshold relaxation pattern when only one-side communication channel of the deleted communication channel, which is a restoration examination target, is usable for the wireless communication. The following describes a threshold relaxation pattern when only one-side communication channel of a deleted communication channel, which is a restoration examination target, is usable for the wireless communication.

When only one-side communication channel adjacent to the deleted communication channel, which is a restoration examination target, is usable for the wireless communication, as described in the first embodiment, the one-side RSSI threshold to be compared with the RSSI value is set to be relatively larger than the both-side RSSI threshold, and the one-side PER threshold to be compared with the PER value is set to be relatively smaller than the both-side PER threshold.

For example, by considering the states of the ±2CH communication channels of the restoration examination target, even when the RSSI value of the one-side communication channel is not very large, a determination can be performed that the communication quality (RSSI value) of the deleted channel, which is a restoration examination target, is improved to a value equal to or larger than the deletion threshold. For example, as shown in (a) of FIG. 16, a definition is made that Channel 3 is the communication channel used for the wireless communication, and Channel 2, which is adjacent to Channel 3, is the deleted channel. In this case, when Channel 3 remains usable for the wireless communication, the deleted Channel 2 is a restoration examination target.

Figure 16:
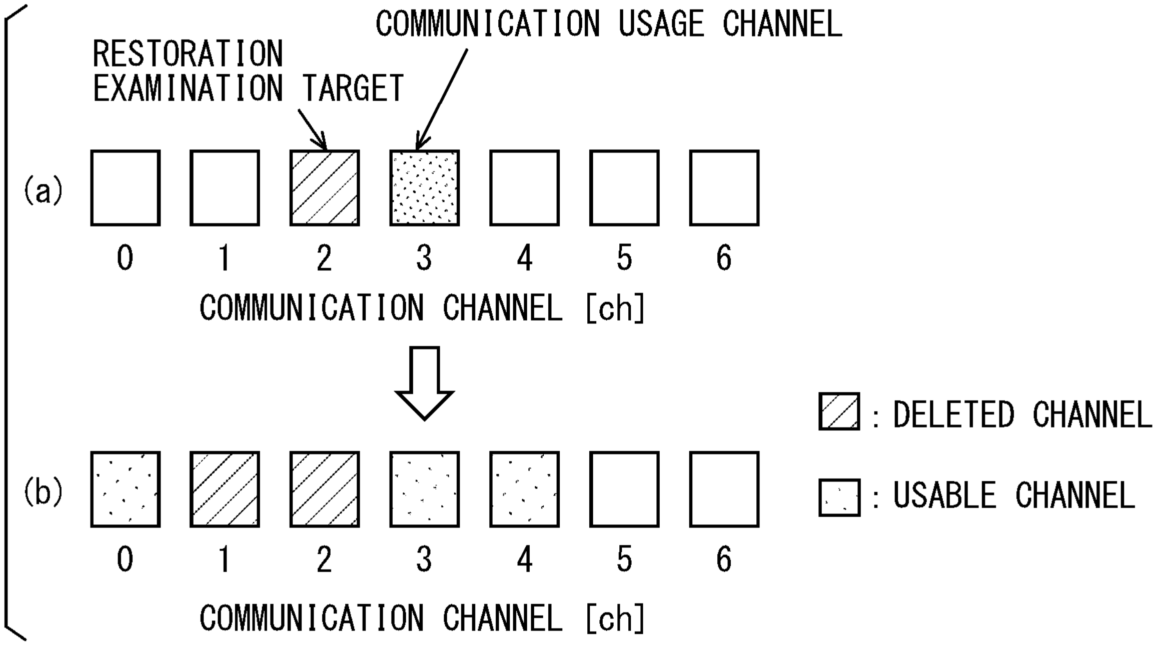
FIG. 16 is a diagram showing a threshold relaxation pattern when only one-side communication channel of the deleted Channel 2 is usable for the wireless communication.
Figure 17:
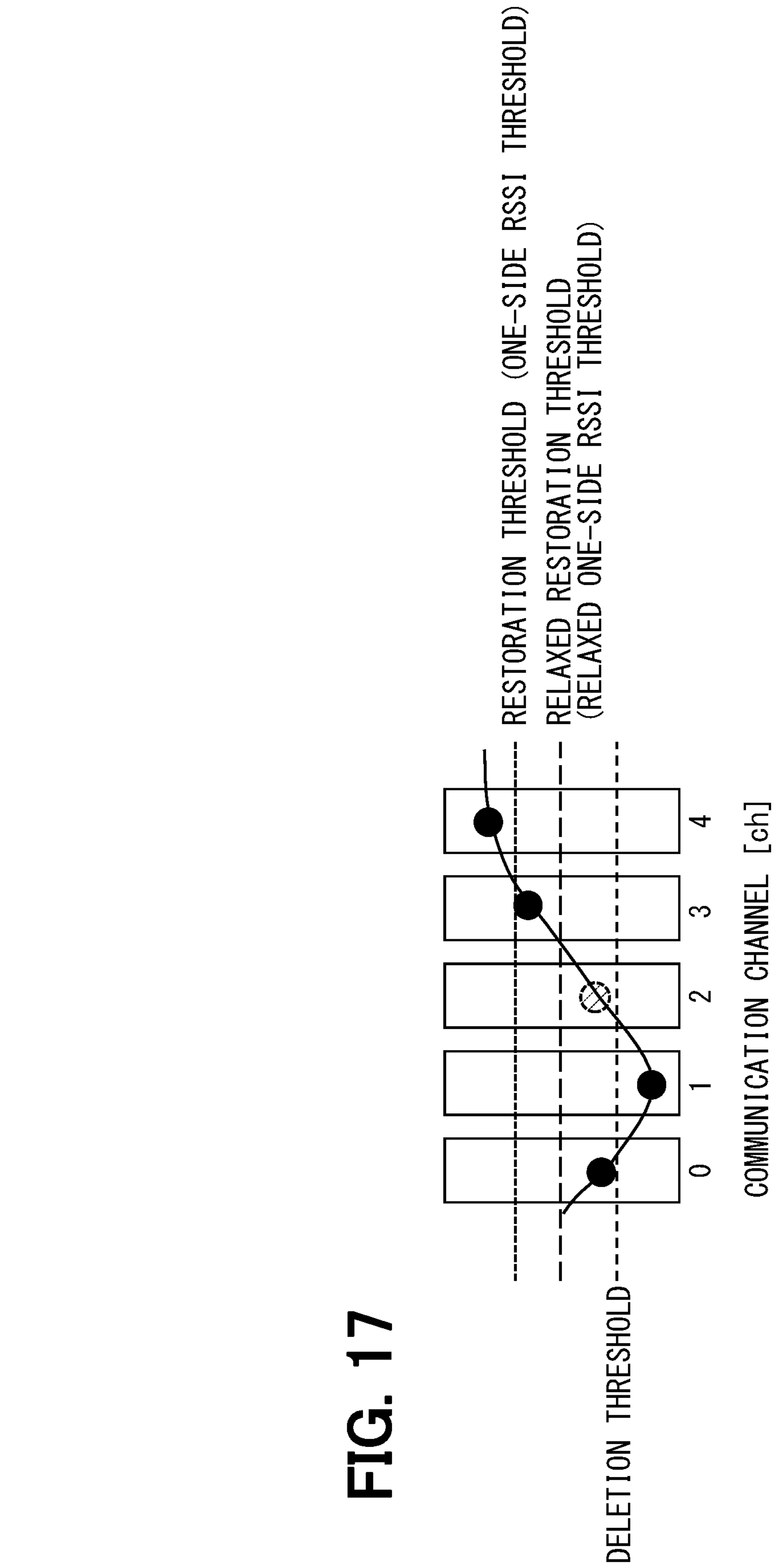
FIG. 17 is a diagram showing an example of a relationship between the RSSI value of each communication channel, and the one-side RSSI threshold and a relaxed one-side RSSI threshold when the threshold relaxation pattern in (b) of FIG. 16 is applied.

When Channels 0 and 4, which are ±2CH communication channels of Channel 2 that is a restoration examination target, are both usable for the wireless communication as shown in (b) of FIG. 16, even when the RSSI value of the one-side communication channel does not exceed the one-side RSSI threshold as shown in FIG. 17, it can be said that there is a high possibility that the communication quality (RSSI value) of the deleted channel (Channel 2) is improved to a value equal to or larger than the deletion threshold. That is, as shown in (b) of FIG. 16, although the ±1CH communication channels (Channel 1 and Channel 3) of Channel 2, which is a restoration examination target, are in a state in which only one-side communication channel is usable for the wireless communication, when the ±2CH communication channels (Channel 0 and Channel 4) of Channel 2, which is a restoration examination target, are both usable for the wireless communication, a determination is made that the threshold relaxation pattern when only one-side communication channel of the deleted communication channel, which is a restoration examination target, is usable for the wireless communication, is applied. On the other hand, when the states of ±1CH communication channels and ±2CH communication channels of the deleted channel, which is a restoration examination target, are patterns other than the threshold relaxation pattern shown in (b) of FIG. 16, the master device 20 determines that the state does not correspond to the threshold relaxation pattern when only one-side communication channel of the deleted communication channel, which is a restoration examination target, is usable for the wireless communication. In other words, (b) of FIG. 16 is a diagram showing a threshold relaxation pattern when only one-side communication channel of the deleted Channel 2, which is a restoration examination target, is usable for the wireless communication.

Figure 18:
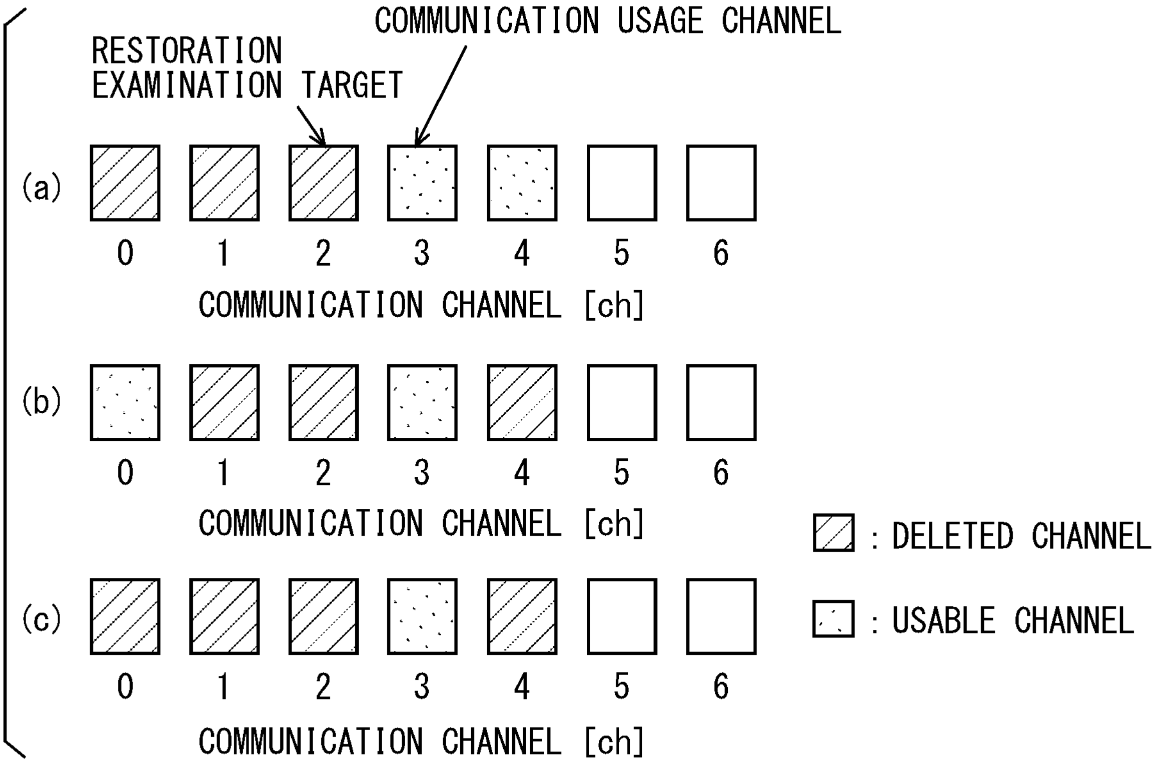
FIG. 18 are diagrams showing patterns other than the threshold relaxation pattern when only one-side communication channel of the deleted Channel 2, which is a restoration examination target, is usable for the wireless communication.

(a) to (c) of FIG. 18 show patterns that do not correspond to the threshold relaxation pattern when only one-side communication channel of the deleted communication channel, which is a restoration examination target, is usable for the wireless communication. (a) and (b) of FIG. 18 show patterns where the ±1CH communication channels (Channel 1 and Channel 3) of Channel 2, which is a restoration examination target, are in a state in which only one-side communication channel is usable for the wireless communication and the ±2CH communication channels (Channel 0 and Channel 4) of Channel 2, which is a restoration examination target, are also in a state in which only one-side communication channel is usable for the wireless communication. (c) of FIG. 18 shows patterns where although the ±1CH communication channels (Channel 1 and Channel 3) of Channel 2, which is a restoration examination target, are in a state in which only one-side communication channel is usable for the wireless communication, the ±2CH communication channels (Channel 0 and Channel 4) of Channel 2, which is a restoration examination target, are in a state in which both-side communication channels have been deleted and cannot be used for the wireless communication.

Figure 19:
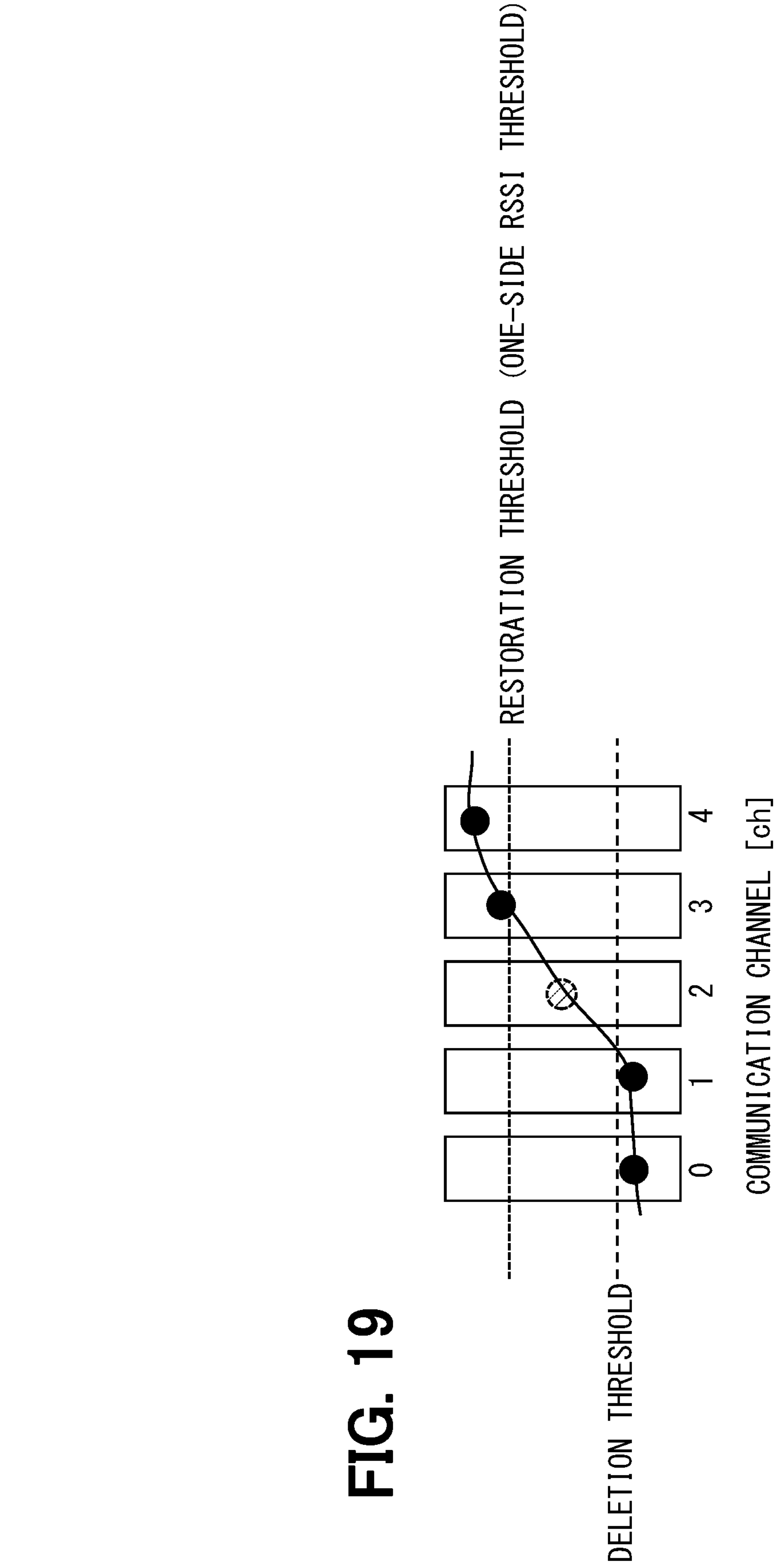
FIG. 19 is a diagram showing an example of a relationship between the RSSI value of each communication channel and the one-side RSSI threshold when the pattern in (a) of FIG. 18 is applied.

For example, FIG. 19 shows a typical example of the RSSI value of each channel in the case of the pattern shown in (a) of FIG. 18. As shown in FIG. 19, two Channels 0 and 1, which are on the left side of Channel 2 that is a restoration examination target, have been deleted, and the RSSI values of the two channels are considered to be below the deletion threshold. Therefore, in the pattern shown in (a) of FIG. 18, when the one-side RSSI threshold is relaxed, even when the RSSI value of Channel 2 is not improved to the extent that the RSSI value exceeds the deletion threshold, the RSSI value of Channel 3 may exceed the relaxed one-side RSSI threshold. Therefore, a determination is made that the pattern shown in (a) of FIG. 18 does not correspond to the threshold relaxation pattern when only one-side communication channel of the deleted communication channel, which is a restoration examination target, is usable for the wireless communication. The same applies to the patterns shown in (b) and (c) of FIG. 18.

Although the degree of relaxation is smaller than that of the pattern shown in (b) of FIG. 16 with respect to the patterns shown in (a) and (b) of FIG. 18, a relaxed one-side threshold, which is more relaxed than the one-side RSSI threshold, may be set. The reason is because the patterns shown in (a) and (b) of FIG. 18 may be determined to have a tendency to improve the communication quality compared to the pattern shown in (c) of FIG. 18. In this way, the relaxed one-side threshold may be set in stages according to the pattern of the states of ±1CH communication channels and ±2CH communication channels of the deleted channel, which is a restoration examination target.

Figure 13:
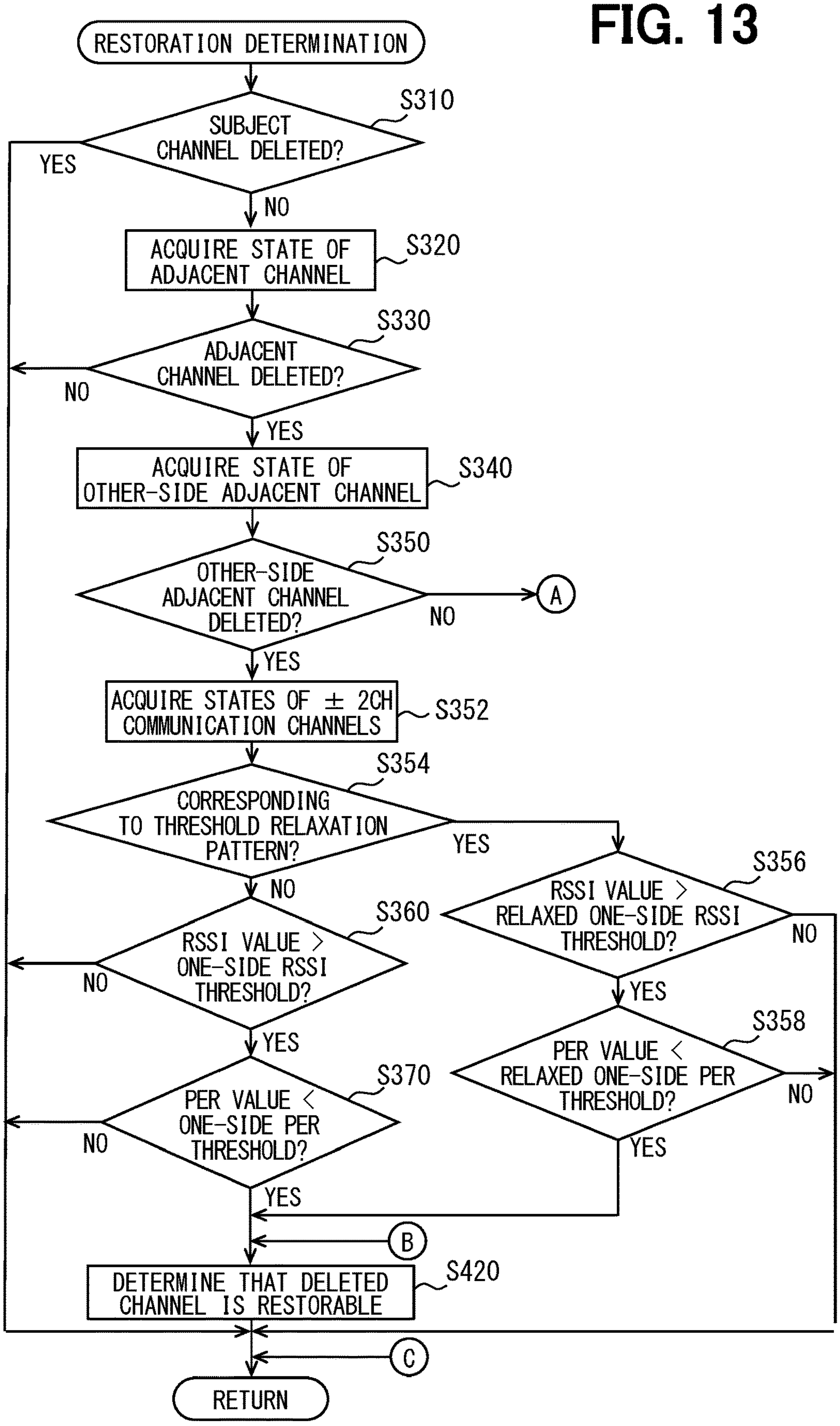
FIG. 13 is a flowchart showing a part of a detailed example of the restoration determination process of the communication channel in a second embodiment.

In step S354 of the flowchart in FIG. 13, when the master device 20 determines that the states of ±1CH communication channels and ±2CH communication channels of the deleted channel, which is a restoration examination target, correspond to the threshold relaxation pattern, the process proceeds to step S356. On the other hand, when the master device 20 determines that the threshold relaxation pattern does not apply, the process proceeds to step S360.

In step S356, the master device 20 determines whether the RSSI value of the one-side communication channel (subject channel), which is usable for the wireless communication, is satisfied (exceeds) by using the relaxed one-side RSSI threshold, which is more relaxed than the one-side RSSI threshold. In step S358, the master device 20 determines whether the PER value of the one-side communication channel (subject channel), which is usable for the wireless communication, is satisfied (below) by using the relaxed one-side PER threshold, which is more relaxed than the one-side PER threshold.

In this way, in the present embodiment, in a case where the states of ±1CH communication channels and ±2CH communication channels of the deleted channel, which is a restoration examination target, correspond to the threshold relaxation pattern when only one-side communication channel of the deleted communication channel, which is a restoration examination target, is usable for the wireless communication, the master device 20 changes the one-side RSSI threshold and the one-side PER threshold, which are used for the restoration determination of the deleted channel, to the relaxed one-side RSSI threshold and the relaxed one-side PER threshold that indicate communication quality lower than the one-side RSSI threshold and the one-side PER threshold. Accordingly, the determination accuracy of restorability of the deleted channel can be further improved. The one-side RSSI threshold and the one-side PER threshold correspond to a second restoration threshold, and the relaxed one-side RSSI threshold and the relaxed one-side PER threshold correspond to a fourth restoration threshold.

The states of ±2 CH communication channels are determined according to the characteristic data (RSSI, PER, or the like) when the wireless communication is performed using the ±2 CH communication channels. Therefore, as described above, when the states of ±2CH communication channels are considered in addition to the states of ±1CH communication channels, changing the one-side RSSI threshold and the one-side PER threshold determines restorability of the deleted channel based not only on the characteristic data of the ±1CH communication channels of the deleted channel, which is a restoration examination target, but also the characteristic data of the ±2CH communication channels of the deleted channel, which is a restoration examination target. That is, in the present disclosure, a "neighboring communication channel" is a concept that includes not only the communication channels (±1CH) adjacent to the deleted channel, which is a restoration examination target, but also at least the communication channels (±2CH) adjacent to the communication channels (±1CH). As the neighboring communication channels, communication states of ±3CH may be considered.

When a determination is made that the RSSI value does not satisfy the relaxed one-side RSSI threshold in step S356, or when a determination is made that the PER value does not satisfy the relaxed one-side PER threshold in step S358, the master device 20 determines that the deleted channel, which is a restoration examination target, is not restorable and ends the process shown in the flowchart in FIG. 13. On the other hand, when a determination is made that the RSSI value satisfies the relaxed one-side RSSI threshold in step S356, and when a determination is made that the PER value satisfies the relaxed one-side PER threshold in step S358, the master device 20 determines that the deleted channel, which is a restoration examination target, is restorable in step S420. Thereafter, the master device 20 ends the process shown in the flowchart in FIG. 13 and returns to the process shown in the flowchart in FIG. 4.

Figure 14:
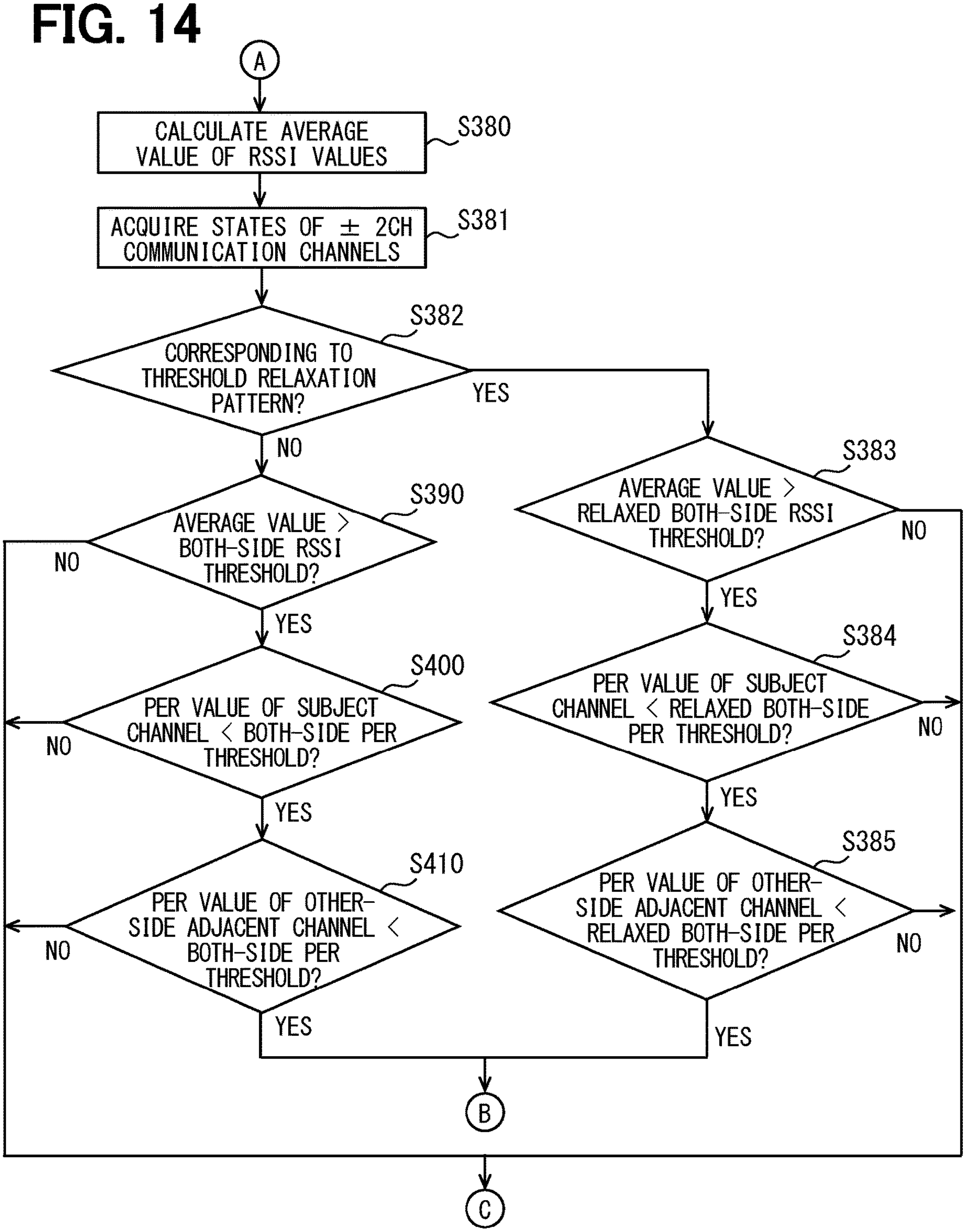
FIG. 14 is a flowchart showing a remaining part of a detailed example of the restoration determination process of the communication channel in the second embodiment.

In step S350 in FIG. 13, when a determination is made that the other-side adjacent channel has not been deleted, the master device 20 proceeds to the process of step S380 of the flowchart in FIG. 14. In step S380, the master device 20 calculates the average value of the RSSI values of each of the subject channel and the other-side adjacent channel. The above point is similar to the restoration determination process of the first embodiment.

In the subsequent step S382, the master device 20 acquires the states of ±2CH communication channels of the deleted channel, which is a restoration examination target. In step S382, the master device 20 determines whether the states of ±1CH communication channels and ±2CH communication channels of the deleted channel, which is a restoration examination target, correspond to the threshold relaxation pattern when both-side communication channels of the deleted communication channel, which is a restoration examination target, are both usable for the wireless communication. The following describes the threshold relaxation pattern when both-side communication channels of the deleted communication channel, which is a restoration examination target, are both usable for the wireless communication.

Figure 20:
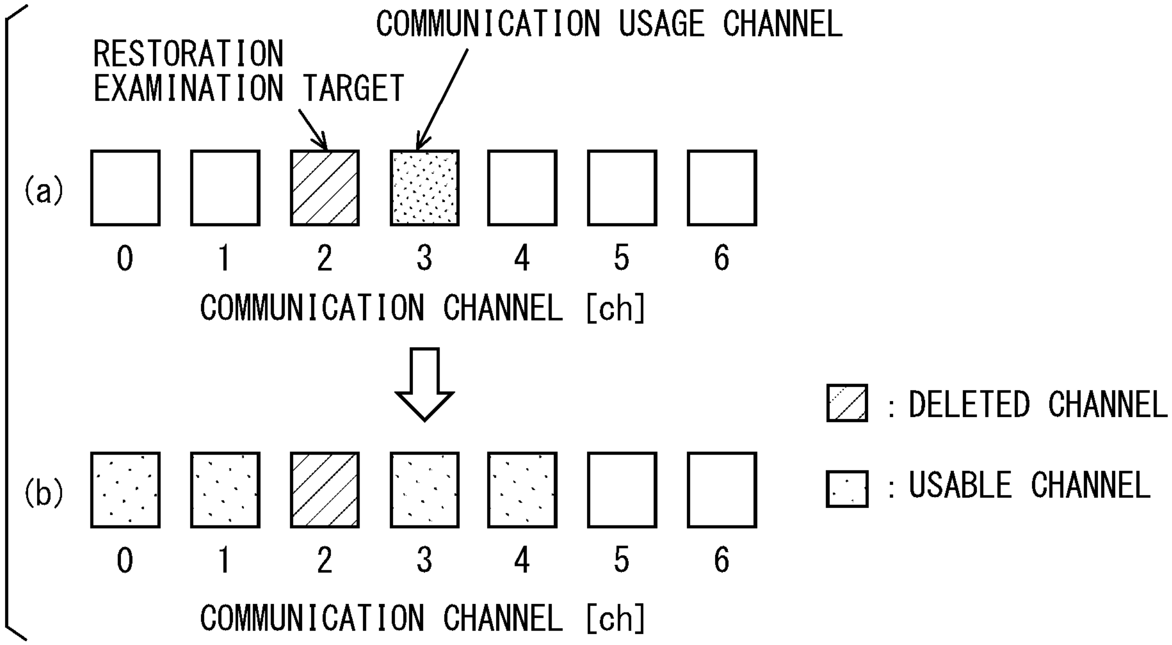
FIG. 20 is a diagram showing a threshold relaxation pattern when both-side communication channels of the deleted Channel 2 are usable for the wireless communication.

For example, as shown in (a) of FIG. 20, a definition is made that Channel 3 is the communication channel used for the wireless communication, and Channel 2, which is adjacent to Channel 3, is the deleted channel. In this case, when Channel 3 remains usable for the wireless communication, the deleted Channel 2 is a restoration examination target.

Figure 21:
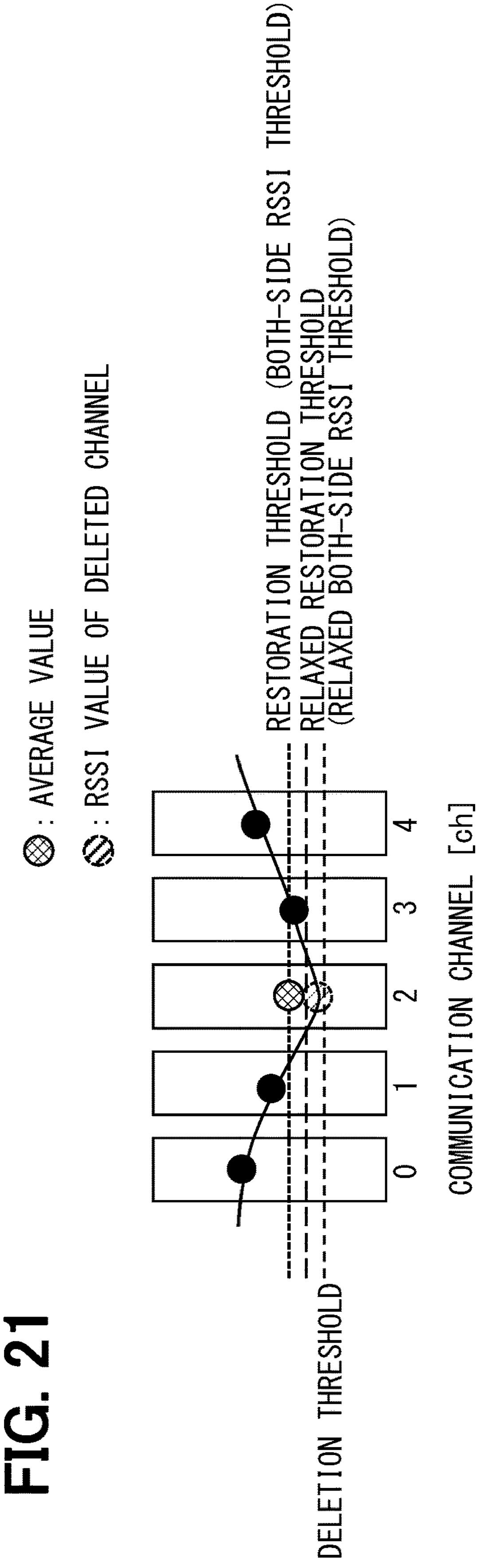
FIG. 21 is a diagram showing an example of a relationship between the RSSI value of each communication channel and the both-side RSSI threshold and a relaxed both-side RSSI threshold when the threshold relaxation pattern in (b) of FIG. 20 is applied.

When Channels 0 and 4, which are ±2CH communication channels of Channel 2 that is a restoration examination target, are both usable for the wireless communication as shown in (b) of FIG. 20, even when the RSSI value of the one-side communication channel of the ±1CH communication channels does not exceed the both-side RSSI threshold as shown in FIG. 21 and even when the average value of the RSSI values of the both-side communication channels does not exceed the both-side RSSI threshold, it can be said that there is a high possibility that the communication quality (RSSI value) of the deleted channel (Channel 2) is improved to a value equal to or larger than the deletion threshold. Therefore, as shown in (b) of FIG. 20, when the ±1CH communication channels (Channel 1 and Channel 3) of Channel 2, which is a restoration examination target, are both usable for the wireless communication, and when the ±2 CH communication channels (Channel 0 and Channel 4) of Channel 2, which is a restoration examination target, are both usable for the wireless communication, a determination is made that the threshold relaxation pattern is applied. On the other hand, when the pattern is other than the threshold relaxation pattern shown in (b) of FIG. 20, the master device 20 determines that the threshold relaxation pattern when both-side communication channels of the deleted communication channel, which is a restoration examination target, are both usable for the wireless communication, is not applied. In other words, (b) of FIG. 20 is a diagram showing a threshold relaxation pattern when both-side communication channels of the deleted Channel 2, which is a restoration examination target, are usable for the wireless communication.

Figure 22:
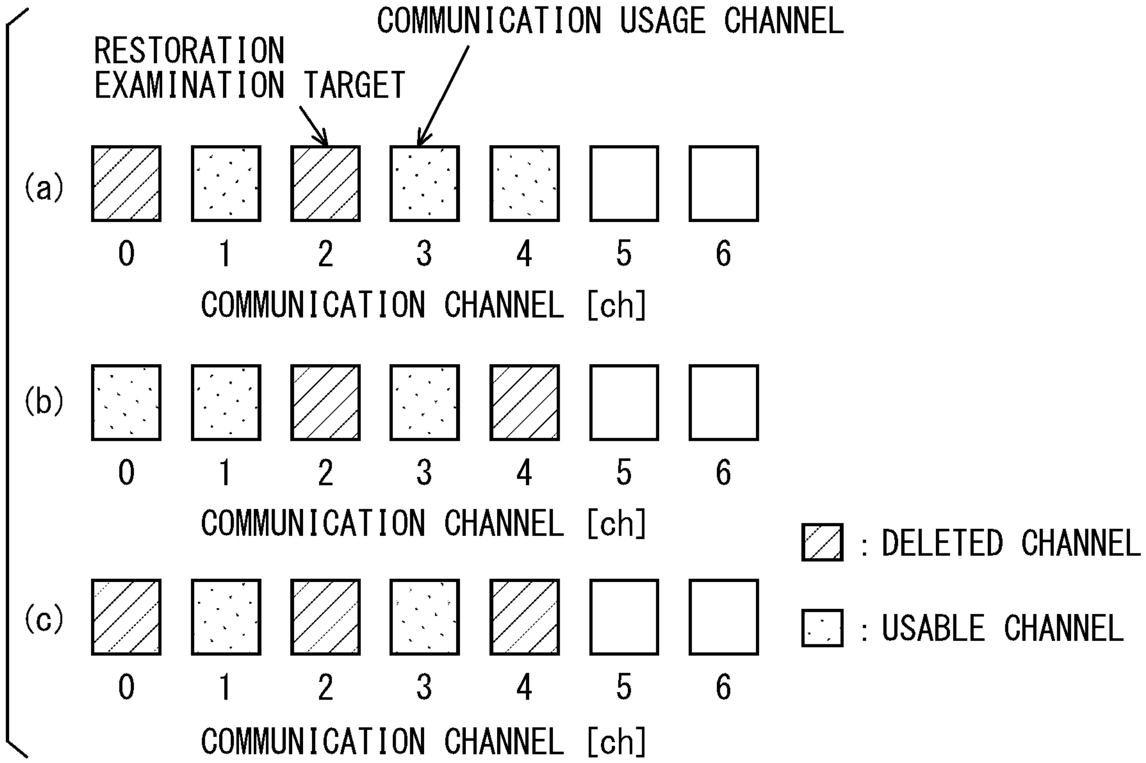
FIG. 22 are diagrams showing patterns other than the threshold relaxation pattern when both-side communication channels of the deleted Channel 2, which is a restoration examination target, are usable for the wireless communication.

(a) to (c) of FIG. 22 show patterns that do not correspond to the threshold relaxation pattern when both-side communication channels of the deleted communication channel, which is a restoration examination target, are both usable for the wireless communication. (a) and (b) of FIG. 22 show patterns where the ±1CH communication channels (Channel 1 and Channel 3) of Channel 2, which is a restoration examination target, are both usable for the wireless communication and the ±2CH communication channels (Channel 0 and Channel 4) of Channel 2, which is a restoration examination target, are in a state in which only one-side communication channel is usable for the wireless communication. (c) of FIG. 22 shows a pattern where the ±1CH communication channels (Channel 1 and Channel 3) of Channel 2, which is a restoration examination target, are both usable for the wireless communication and the ±2CH communication channels (Channel 0 and Channel 4) of Channel 2, which is a restoration examination target, are in a state in which both-side communication channels have been deleted and cannot be used for the wireless communication.

Figure 23:
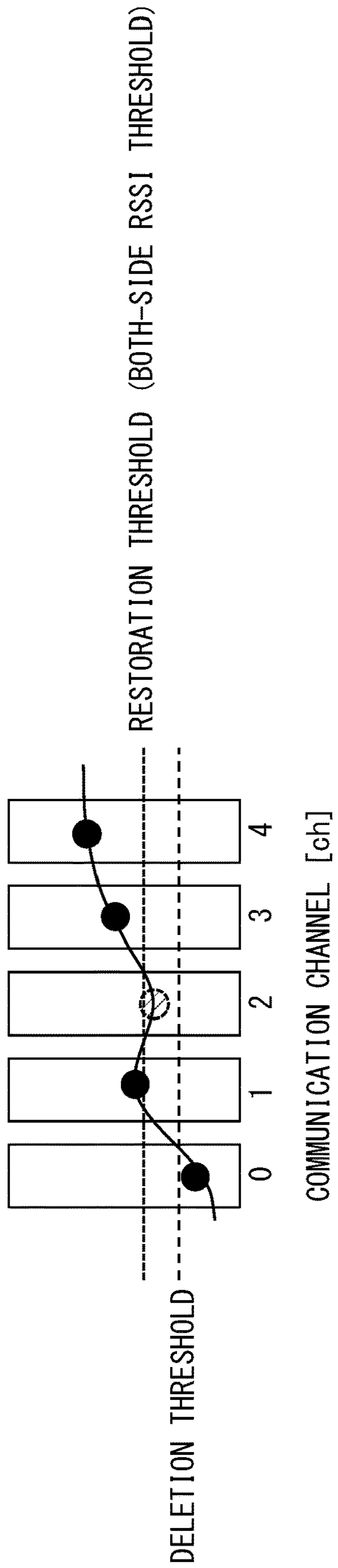
FIG. 23 is a diagram showing an example of a relationship between the RSSI value of each communication channel and the both-side RSSI threshold when the pattern in (a) of FIG. 22 is applied.

For example, FIG. 23 shows a typical example of the RSSI value of each channel in the case of the pattern shown in (a) of FIG. 22. As shown in FIG. 23, Channel 0, which corresponds to −2CH on the left side of Channel 2 that is a restoration examination target, has been deleted, and the RSSI value of Channel 0 is considered to be below the deletion threshold. Therefore, in the pattern shown in (a) of FIG. 22, when the both-side RSSI threshold is relaxed, even when the RSSI value of Channel 2 is not improved to the extent that the RSSI value exceeds the deletion threshold, the RSSI values of Channel 1 and Channel 3 may exceed the relaxed both-side RSSI threshold. Therefore, a determination is made that the pattern shown in (a) of FIG. 22 does not correspond to the threshold relaxation pattern when both-side communication channels of the deleted communication channel, which is a restoration examination target, are both usable for the wireless communication. The same applies to the patterns shown in (b) and (c) of FIG. 22.

Although the degree of relaxation is smaller than that of the pattern shown in (b) of FIG. 20 with respect to the patterns shown in (a) and (b) of FIG. 22, a relaxed both-side threshold, which is more relaxed than the both-side RSSI threshold, may be set. The reason is because the patterns shown in (a) and (b) of FIG. 22 may be determined to have a tendency to improve the overall communication quality compared to the pattern shown in (c) of FIG. 22. In this way, the relaxed both-side threshold may be set in stages according to the pattern of the states of ±1CH communication channels and ±2CH communication channels of the deleted channel, which is a restoration examination target.

In step S382 of the flowchart in FIG. 14, the master device 20 determines that the states of ±1CH communication channels and ±2CH communication channels of the deleted channel, which is a restoration examination target, correspond to the threshold relaxation pattern when both-side communication channels of the deleted communication channel, which is a restoration examination target, are both usable for the wireless communication, and the process proceeds to step S383. On the other hand, when the master device 20 determines that the threshold relaxation pattern when both-side communication channels of the deleted communication channel, which is a restoration examination target, are both usable for the wireless communication, is not applied, the process proceeds to step S390.

In step S383, the master device 20 determines whether the RSSI average value, which is calculated in step S380, satisfies (exceeds) the relaxed both-side RSSI threshold, which is more relaxed (made to be smaller) than the both-side RSSI threshold. In step S384, the master device 20 determines whether the PER value of the subject channel, which is one of the both-side communication channels that are usable for the wireless communication, satisfies (below) the relaxed both-side PER threshold, which is more relaxed (made to be larger) than the both-side PER threshold. In step S385, a determination is made whether the PER value of the other-side adjacent channel, which is another one of the both-side communication channels that are usable for the wireless communication, similarly satisfies (below) the relaxed both-side PER threshold.

In this way, in the present embodiment, in a case where the states of ±1CH communication channels and ±2CH communication channels of the deleted channel, which is a restoration examination target, correspond to the threshold relaxation pattern when both-side communication channel of the deleted communication channel, which is a restoration examination target, are both usable for the wireless communication, the master device 20 changes the both-side RSSI threshold and the both-side PER threshold, which are used for the restoration determination of the deleted channel, to the relaxed both-side RSSI threshold and the relaxed both-side PER threshold that indicate communication quality lower than the both-side RSSI threshold and the both-side PER threshold. Accordingly, the determination accuracy of restorability of the deleted channel can be further improved. The both-side RSSI threshold and the both-side PER threshold correspond to a first restoration threshold, and the relaxed both-side RSSI threshold and the relaxed both-side PER threshold correspond to a third restoration threshold.

When a determination is made that the RSSI average value does not satisfy the relaxed both-side RSSI threshold in step S383, when a determination is made that the PER value of the subject channel does not satisfy the relaxed both-side PER threshold in step S384, or when a determination is made that the PER value of the other-side adjacent channel does not satisfy the relaxed both-side PER threshold in step S385, the master device 20 determines that the deleted channel, which is a restoration examination target, is not restorable, and ends the processes shown in the flowcharts in FIGS. 13 and 14. On the other hand, when a determination is made that the RSSI average value satisfies the relaxed both-side RSSI threshold in step S383, when a determination is made that the PER value of the subject channel satisfies the relaxed both-side PER threshold in step S384, and when a determination is made that the PER value of the other-side adjacent channel satisfies the relaxed both-side PER threshold in step S385, the master device 20 proceeds to step S420 of the flowchart in FIG. 13 and determines that the deleted channel, which is a restoration examination target, is restorable. Thereafter, the master device 20 ends the process shown in the flowchart in FIG. 13 and returns to the process shown in the flowchart in FIG. 4.

The same effects as in the first embodiment can be achieved even with the restoration determination process of the second embodiment. According to the restoration determination process of the second embodiment, restorability of the deleted channel, which is a restoration examination target, can be determined with higher accuracy by considering the states of ±2CH communication channels of the restoration examination target.

Although the preferred embodiments of the present disclosure have been described above, the present disclosure is not limited to the embodiments described above, and can be implemented with various modifications without departing from the gist of the present disclosure.

For example, in the first and second embodiments described above, PER is used as second characteristic data. However, instead of the error rate of packet communication, a packet arrival rate (PAR), which is the success rate of the packet communication, can also be used. When PAR is used, the magnitude relationship with the threshold is opposite to that in the first and second embodiments described above.

What is claimed is:

1. A wireless communication system that performs wireless communication between a master device and a slave device via one communication channel, which is sequentially selected from a plurality of communication channels, the wireless communication system comprising:

at least one of (i) a circuit and (ii) a processor with a memory storing computer program code executable by the processor, the at least one of the circuit and the processor configured to serve as a detector that detects characteristic data indicating communication quality in the performed wireless communication, for each of the communication channels;

a deleter that deletes a communication channel, in which deterioration in communication quality is determined based on the characteristic data detected by the detector, from the plurality of communication channels used for the wireless communication; and a determiner that determines, based on the characteristic data of a neighboring communication channel close in frequency to a communication channel that has been deleted by the deleter, restorability of the deleted communication channel to the plurality of communication channels used for the wireless communication, wherein the determiner determines restorability of the deleted communication channel according to different determination standards of a case where both-side communication channels adjacent to the deleted communication channel, which is a restorability determination target, are usable for the wireless communication and a case where only one-side communication channel adjacent to the deleted communication channel, which is a restorability determination target, is usable for the wireless communication, and the determiner determines that, when the both-side communication channels adjacent to the deleted communication channel, which is a restorability determination target, are usable for the wireless communication, the deleted communication channel is restorable to the plurality of communication channels used for the wireless communication based on a fact that the characteristic data of the both-side communication channels satisfies a first restoration threshold, and when the only one-side communication channel adjacent to the deleted communication channel, which is a restorability determination target, is usable for the wireless communication, the deleted communication channel is restorable to the plurality of communication channels used for the wireless communication based on a fact that the characteristic data of the one-side communication channel satisfies a second restoration threshold indicating communication quality higher than communication quality indicated by the first restoration threshold.

2. The wireless communication system according to claim 1, wherein in a case where the wireless communication is performed between the master device and the slave device via the one communication channel, selected from the plurality of communication channels used for the wireless communication, the determiner determines, when an adjacent communication channel adjacent in frequency to the one communication channel has been deleted by the deleter, restorability of the deleted adjacent communication channel.

3. The wireless communication system according to claim 2, wherein the determiner does not determine, when the deleter determines deterioration in communication quality of the communication channel used for the wireless communication based on the characteristic data and deletes the communication channel from the plurality of communication channels used for the wireless communication, restorability of the communication channel adjacent to the communication channel used for the wireless communication.

4. The wireless communication system according to claim 1, wherein the determiner changes, when the both-side communication channels adjacent to the deleted communication channel, which is a restorability determination target, are usable for the wireless communication and when the communication channels, which are respectively adjacent to the both-side communication channels and are on opposite sides of the deleted communication channel, are usable for the wireless communication, the first restoration threshold to a third restoration threshold indicating communication quality lower than the communication quality indicated by the first restoration threshold.

5. The wireless communication system according to claim 1, wherein the determiner changes, when the only one-side communication channel adjacent to the deleted communication channel, which is a restorability determination target, is usable for the wireless communication and when the communication channels, which are respectively adjacent to the both-side communication channels of the deleted communication channel and are on opposite sides of the deleted communication channel, are usable for the wireless communication, the second restoration threshold to a fourth restoration threshold indicating communication quality lower than the communication quality indicated by the second restoration threshold.

6. The wireless communication system according to claim 1, wherein the determiner determines that, when the both-side communication channels adjacent to the deleted communication channel, which is a restorability determination target, are usable for the wireless communication, the deleted communication channel is restorable to the plurality of communication channels used for the wireless communication based on a fact that the both-side communication channels are usable for the wireless communication.

7. The wireless communication system according to claim 1, wherein the plurality of communication channels has a first channel group including a plurality of communication channels used for a connection establishment process of establishing a communication connection between the master device and the slave device, and a second channel group including a plurality of communication channels used for a communication process of performing data communication between the master device and the slave device, and the communication channel, which is deleted from the plurality of communication channels used for the wireless communication by the deleter, is the communication channel included in the second channel group.

8. The wireless communication system according to claim 1, wherein the wireless communication is packet communication, and the characteristic data is at least one of received signal strength, signal-to-noise ratio/signal interference-to-noise ratio, packet error rate, packet arrival rate, and bit error rate in the packet communication.

9. The wireless communication system according to claim 1, wherein at least one of the master device and the slave device is mounted on a moving object.

10. The wireless communication system according to claim 9, wherein the moving object is a vehicle.

11. A wireless communication method of performing wireless communication between a master device and a slave device via one communication channel, which is sequentially selected from a plurality of communication channels, the wireless communication method comprising:

a detection step of detecting characteristic data indicating communication quality in the performed wireless communication, for each of the communication channels;

a deletion step of deleting the communication channel, in which deterioration in communication quality is determined based on the characteristic data detected in the detection step, from the plurality of communication channels used for the wireless communication; and a determination step of determining, based on the characteristic data of a neighboring communication channel close in frequency to a communication channel that has been deleted in the deletion step, restorability of the deleted communication channel to the plurality of communication channels used for the wireless communication, wherein the determination step determines restorability of the deleted communication channel according to different determination standards of a case where both-side communication channels adjacent to the deleted communication channel, which is a restorability determination target, are usable for the wireless communication and a case where only one-side communication channel adjacent to the deleted communication channel, which is a restorability determination target, is usable for the wireless communication, and the determination step determines that, when the both-side communication channels adjacent to the deleted communication channel, which is a restorability determination target, are usable for the wireless communication, the deleted communication channel is restorable to the plurality of communication channels used for the wireless communication based on a fact that the characteristic data of the both-side communication channels satisfies a first restoration threshold, and when the only one-side communication channel adjacent to the deleted communication channel, which is a restorability determination target, is usable for the wireless communication, the deleted communication channel is restorable to the plurality of communication channels used for the wireless communication based on a fact that the characteristic data of the one-side communication channel satisfies a second restoration threshold indicating communication quality higher than communication quality indicated by the first restoration threshold.

* * * * *